US012719819B1

(12) United States Patent
Greenspan et al.

(10) Patent No.: US 12,719,819 B1
(45) Date of Patent: Aug. 25, 2026

(54) TAG MATCHING MECHANISM AND METHOD AND COMPUTING SYSTEM FOR USING THEREOF

(71) Applicant: NEXT SILICON LTD., Givatayim (IL)

(72) Inventors: Daniel Greenspan, Jerusalem (IL); Alexander Margolin, Ashdod (IL); Menashe Daskal, Haifa (IL)

(73) Assignee: NEXT SILICON LTD., Givatayim (IL)

( * ) Notice: Subject to any disclaimer, the term of this patent is extended or adjusted under 35 U.S.C. 154(b) by 0 days.

(21) Appl. No.: 19/434,723

(22) Filed: Dec. 29, 2025

(51) Int. Cl.
*H04L 49/9005* (2022.01)

(52) U.S. Cl.
CPC ................................ *H04L 49/9005* (2013.01)

(58) Field of Classification Search
CPC .................................................. H04L 49/9005
USPC ......................................................... 370/352
See application file for complete search history.

(56) References Cited

U.S. PATENT DOCUMENTS

2010/0316199 A1* 12/2010 Martin, II ........... H04L 65/1045 379/88.08
2020/0233752 A1* 7/2020 Wong ................. G06F 11/1453

* cited by examiner

*Primary Examiner* — Faisal Choudhury
(74) *Attorney, Agent, or Firm* — The Roy Gross Law Firm, LLC; Roy D. Gross

(57) ABSTRACT

The present invention provides a hardware-based tag matching mechanism that may include a cyclic buffer with segments arranged by age, each segment containing tag entries storing tagging patterns. The mechanism may further include an appendage buffer, configured to store tagging patterns evicted from the cyclic buffer. A lookup engine may match incoming data blocks against stored tagging patterns, searching appendage buffer entries first, then cyclic buffer segments from oldest to newest. A control circuit may be adapted to evict tag entries from the current oldest cyclic buffer segment to the appendage buffer, then rotates the cyclic buffer to redefine the oldest segment. A memory access manager may calculate a target address of a memory device based on an index of a located tag entry and may access the memory device at the target address to retrieve or write data corresponding to the incoming data packet, thereby facilitating content-addressable memory operations.

21 Claims, 10 Drawing Sheets

TAG MATCHING MECHANISM AND METHOD AND COMPUTING SYSTEM FOR USING THEREOF

FIELD OF INVENTION

The present invention relates generally to computing systems. More specifically, the present invention relates to a tag matching mechanism and a system and method of using thereof.

BACKGROUND

In computing systems, the term "tag matching" may refer to the process of comparing incoming data identifiers against stored reference values to determine appropriate handling or routing. Tag matching may enable efficient lookup and retrieval operations by associating data patterns with memory addresses or other resources.

Many applications of tag matching make use of content addressable memory (CAM), where data is retrieved based on content rather than address location. A specialized form of CAM is Ternary Content-Addressable Memory (TCAM), which is often used in networking hardware to match multiple groups of packets. TCAM extends CAM functionality by supporting wildcard or "don't care" bits in stored patterns, enabling flexible matching operations. Matching is done by providing a bit pattern to match against, and a bit mask, where the mask bits are used to specify which bits of the packet need to match the pattern, and which portions may be ignored.

Modern network communications involve various data formats such as Internet Protocol version 4 (IPv4) packets, Internet Protocol version 6 (IPv6) packets, Message Passing Interface (MPI) data used in parallel computing environments, and the like.

CAM/TCAM systems based on communication packets may handle access to computational resources according to data included in the packets, including for example an address of a sender or receiver, or data transferred therebetween.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Embodiments of the invention may provide a system for managing computing resources based on tag matching. According to some embodiments, software and/or hardware-based applications may request access to computing resources such as memory or network resources for various processes, threads or clients. These requests may be conveyed as communication messages such as Internet Protocol (IP) packets, Message Passing Interface (MPI) data or the like, to be parsed and served by embodiments of the invention.

It may be desirable to handle these requests according to their arrival order, e.g., as in a First-In-First-Out (FIFO) order, to maintain temporal locality and optimize resource utilization. For example, maintaining request order may ensure fair resource allocation among competing processes and preserve the intended execution sequence of dependent operations. Additionally, when multiple requests from the same software or hardware source require access to sequentially allocated memory regions, processing them in order may prevent inefficient seeking operations and reduce latency.

Conventional content addressable memory systems face significant limitations when attempting to maintain proper ordering while accommodating new request entries. Traditional approaches require time-consuming compression operations that involve moving potentially thousands of entries, with each entry requiring a read and write cycle. In many scenarios, a high proportion of entries may be in use, requiring almost all entries to be relocated during compression. Conversely, if compression is not performed, placing new entries in available positions may break the desired FIFO principle, that entries are matched in order, which may cause problems with sequentially assigned hardware resources and disrupt the intended execution sequence.

As explained herein, embodiments of the invention may address the challenges of traditional content addressable memory systems by providing a hardware-based tag matching mechanism that includes a cyclic buffer with age-organized segments and an appendage buffer for evicted patterns. This architecture may enable efficient pattern matching while maintaining the desired ordering properties, avoiding the time-consuming compression operations required by conventional approaches.

According to some embodiments, the tag matching mechanism may be configured to manage a queue with age-based preference. The tag entries of the appendage buffer and cyclic buffer may collectively implement a queue that is accessible at random while applying age-related preference. This biased random access capability may enable applications to select entries at random with a preference toward older entries, reducing the number of entries remaining a long time in the queue while allowing flexibility in resource selection.

In some embodiments, the tag matching mechanism may maintain a plurality of tag entries in the appendage buffer and cyclic buffer, where each tag entry is associated with a corresponding computing resource via an indirect addressing table. Upon receiving a request (e.g., from a computing device) to access a computing resource, the computing device may calculate a biased random index. For example, tag matching mechanism may calculate the biased random index by selecting a random value between 0 and $(N-1)$, where N represents a total number of tag entries, squaring the random value, dividing the result by N, and rounding to the nearest integer value. The biased random index may be biased towards lower numbers representing indices of older tag entries in the tag-matching search order. This biasing technique may ensure that older entries have a higher probability of being selected, reducing the occurrence of entries ageing excessively without being accessed.

The tag matching mechanism may locate a tag entry corresponding to the biased random index and may utilize the indirect addressing table to invoke the computing resource associated with the located tag entry. Subsequently, the tag matching mechanism may invalidate the located tag entry, thereby creating a hole in the queue. The tag matching mechanism may manage the queue by compressing the appendage buffer as required by omitting gaps of invalidated tag entries, rotating the cyclic buffer as required by reassigning age designations to segments, inserting content to new entries in the newest segment, and revoking entries that have aged beyond expectations, as elaborated herein.

The foregoing general description of the illustrative embodiments and the following detailed description thereof are merely exemplary aspects of the teachings of this disclosure and are not restrictive.

BRIEF DESCRIPTION OF FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Figure 1:
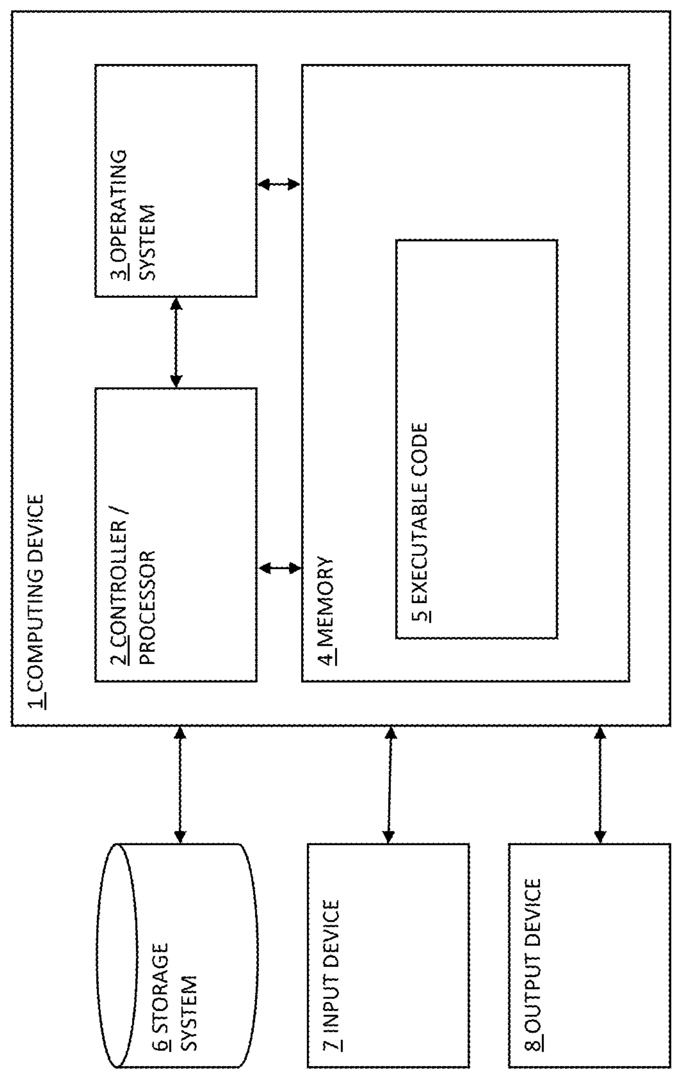
FIG. 1 is a block diagram depicting a computing device, which may be included within a system or mechanism that utilizes tag matching, according to some embodiments of the invention.

Reference is now made to FIG. 1, which is a block diagram depicting a computing device 1, which may be included within, or associated with a system or mechanism that utilizes tag matching, according to some embodiments of the invention.

As used herein, the term "tag matching" may refer to the process of comparing incoming data against stored patterns or tags to identify matches and trigger corresponding actions. In some embodiments, tag matching may enable efficient lookup and retrieval operations by associating data patterns with memory addresses or other resources.

For example, the tag matching mechanism may maintain a collection of tagging patterns, where each pattern represents a configuration or characteristic of interest, and may search through these patterns to locate matches with incoming data packets or data blocks.

In another example, tag matching may be used to implement a Content Addressable Memory (CAM) or Ternary Content Addressable Memory (TCAM)-based interface. In such implementations, the tag matching mechanism may match tagging patterns against incoming data packets, such as network packets containing IP addresses, protocol types, or port numbers. When a match is found, the mechanism may retrieve the corresponding memory address and access the associated data, enabling high-speed packet classification and routing operations. As known in the art, CAM/TCAM may accelerate hardware applications by avoiding the need for laborious or tree-based searches for matching values through tables held in regular SRAM or similar memory devices.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device 1 that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., a software-based application, a program, a process, task, script or the like. Executable code 5 may be executed by processor or controller 2 possibly under control of operating system 3. For example, executable code 5 may be a software-based or hardware-based application that may require a mechanism for tag matching, as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to a specific application, requiring a service of tag matching may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 2:
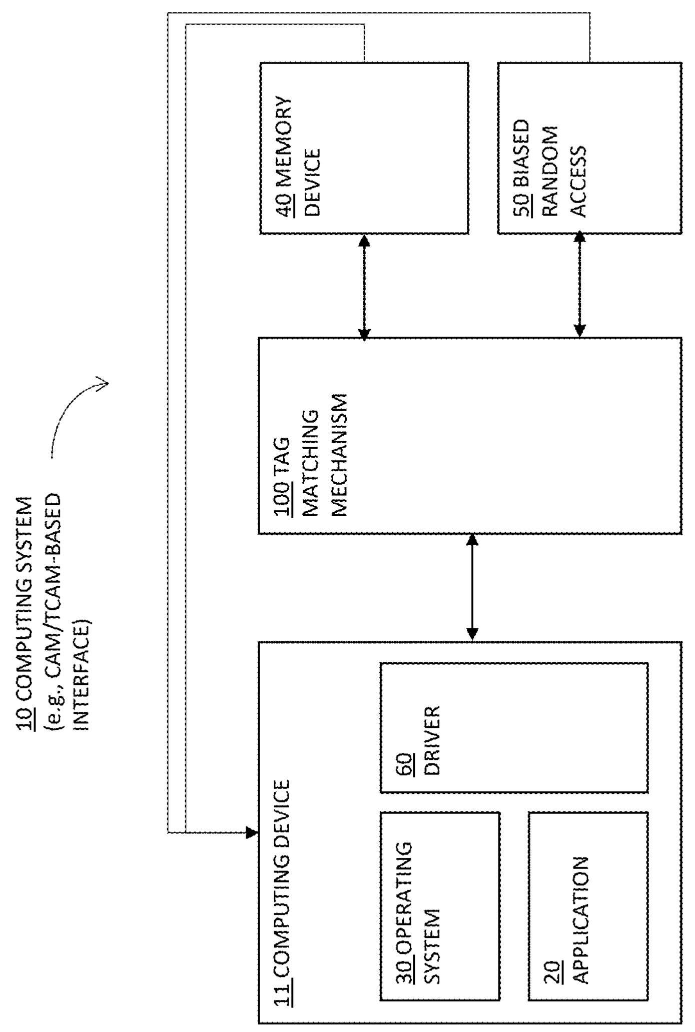
FIG. 2 is a block diagram of a computing system that may incorporate or utilize a hardware-based tag matching mechanism, according to some embodiments of the invention.

Reference is now made to FIG. 2, which is block diagram of a computing system 10 that may incorporate or utilize a hardware-based tag matching mechanism, according to some embodiments of the invention. As shown in FIG. 2, arrows may represent flow of one or more data elements to and from system 10 and/or among modules or elements of system 10. Some arrows have been omitted in FIG. 2 for the purpose of clarity.

According to some embodiments of the invention, system 10 may be implemented as a combination of software and hardware modules. For example, system 10 may include, or may be communicatively connected to a computing device 11 (e.g., such as computing device 1 of FIG. 1). Computing device 11 may be adapted to execute, or employ an application element 20 that may require tag matching functionality, such as content addressable access to a memory device 40.

In some embodiments, application element 20 (or "application 20" for short) may be a software-based application such as a network packet processing application, configured to process or classify incoming data packets based on their header information.

Additionally, or alternatively, application element 20 may be a hardware-based element such as a communication board that may be employed by computing device 11, and may require tag matching functionality for processing network traffic or managing data flows.

System 10 may further include a tag matching mechanism 100, which may be implemented as a hardware-based component configured to accelerate tag matching operations, thereby accommodating the requirements of application 20.

System 10 may thereby optionally provide a solution that combines the flexibility and programmability of application elements 20 with the speed and efficiency of a hardware-based tag matching mechanism 100, enabling high-performance pattern matching operations while maintaining the ability to dynamically update tagging patterns 21 according to the needs of application element 20.

As shown in FIG. 2, computing device 11 may also implement, or execute an operating system 30 (e.g., such as operating system 3 of FIG. 1) and/or a driver module 60, which may be configured to provide aspects of interface between application 20 and the hardware-based tag matching mechanism 100, as elaborated further herein.

In some embodiments, upon locating a matching tag entry, lookup engine 110 may emit an indication of a match, such as an index 110X of the matched entry 140TE/160TE as described herein. This index 110X may be utilized by computing device 11 or application element 20 in various ways, depending on the requirements of the specific implementation.

For example, the index 110X may be used to invoke or terminate a process or thread associated with the matched tag entry. In such embodiments, each tag entry 140TE/160TE may be associated with a respective process identifier, and upon receiving the index 110X, computing device 11 may initiate execution of the corresponding process or issue a termination signal to stop a running process.

Additionally, or alternatively, the index 110X may be used to generate a chip-control signal. For example, the index 110X may be provided to a hardware controller that translates the index into a control signal for configuring or activating a specific hardware component, such as enabling a particular communication channel, selecting a processing unit, or triggering a hardware interrupt.

In another example, the index 110X may be used to select a routing path for incoming data. For example, in a network switching application, the index 110X may indicate which output port or queue should handle an incoming data packet, enabling high-speed packet routing decisions without requiring additional lookup operations.

In another example, the index 110X may be used to retrieve configuration parameters or function pointers from a lookup table, enabling computing device 11 to dynamically select and execute different processing routines based on the matched tagging pattern.

In yet another example, the system 10 may implement a CAM or TCAM based interface system 10, providing content-addressable access to one or more memory devices 40. The memory device 40 may be any suitable storage device, such as a RAM, flash memory, or other memory unit as described with respect to FIG. 1.

Additionally, or alternatively, the computing device 1 may interface with the tag matching mechanism 100 to implement a mechanism for biased random access 50. The biased random access 50 may utilize the tag matching capabilities of the tag matching mechanism 100 to perform weighted or probabilistic selection operations based on stored tagging patterns 21, as elaborated further herein.

Figure 3:
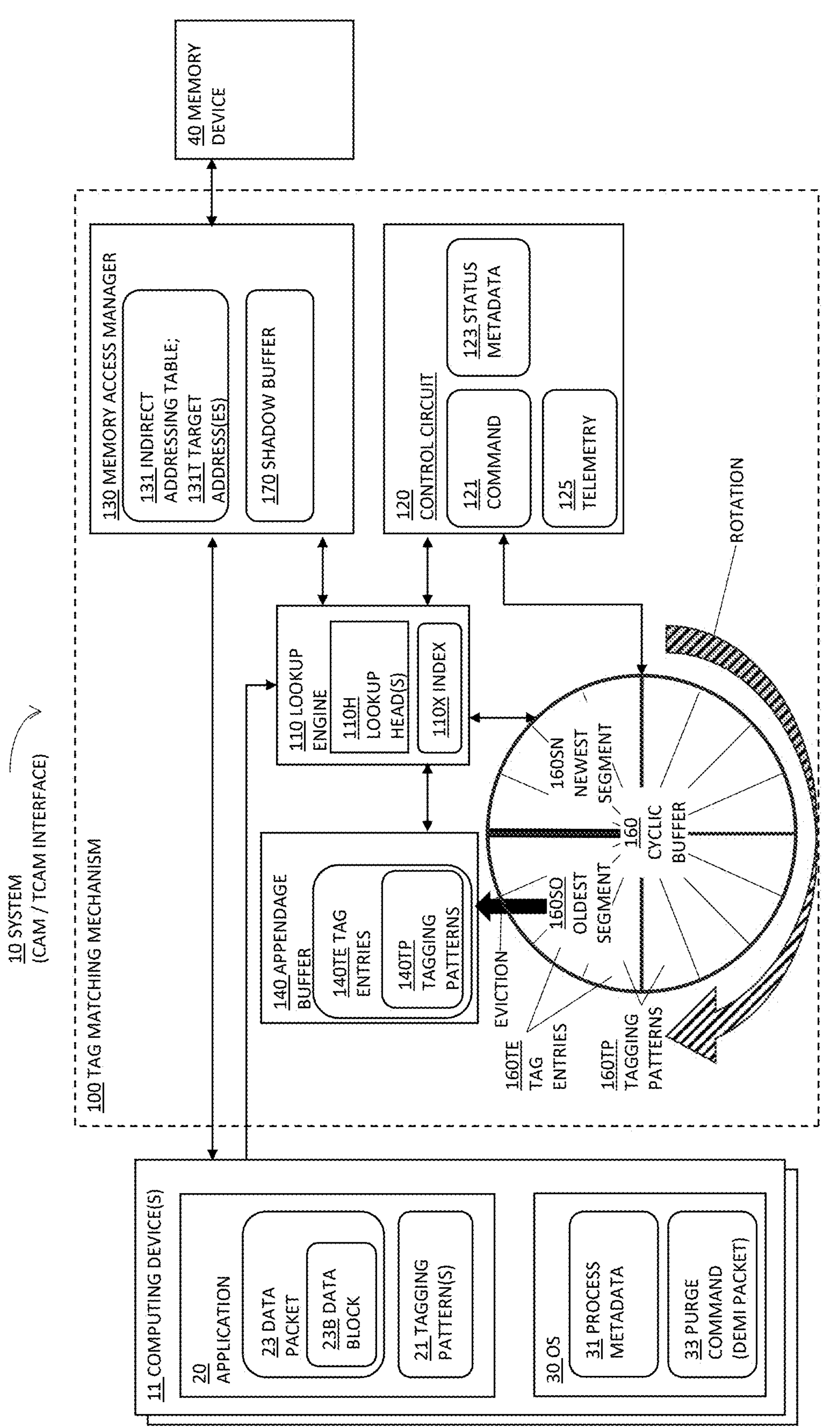
FIG. 3 is another block diagram of the computing system that may incorporate or utilize a hardware-based tag matching mechanism, according to some embodiments of the invention.

Reference is now made to FIG. 3 which is a block diagram depicting a system 10 that may be the same as system 10 of FIG. 2. As shown, system 10 may include a hardware-based tag matching mechanism 100 configured to perform tag matching operations. System 10 may further include, or may be communicatively connected to a computing device 11 such as computing device 11 of FIG. 2.

Computing device 11 may employ, or execute an application element 20 that requires a tag matching service. Tag matching mechanism 100 may be configured to accommodate that requirement. In the example of FIG. 3, tag matching mechanism 100 may implement a CAM or TCAM based interface, allowing application 20 to perform content addressable access to one or more memory devices 40.

According to some embodiments, application element 20 may generate and transmit tagging patterns 21 to the tag matching mechanism 100. As used herein, tagging patterns 21, 140TP, and 160TP may represent different aspects or stages of the same data structures during operation of system 10. For example, a tagging pattern 21 generated by application 20 may become a tagging pattern 160TP when stored in a tag entry 160TE of cyclic buffer 160, and may subsequently become a tagging pattern 140TP when evicted to a tag entry 140TE of appendage buffer 140. Throughout this disclosure, these references may be used interchangeably according to context.

According to some embodiments, one or more (e.g., each) tagging pattern 21 may represent a configuration or characteristic of interest in a process of application element 20.

Additionally, or alternatively, an application element 20 of the same computing device 11 or another computing device 11 may generate, or transfer data to be matched against tagging patterns 140TP/160TP stored on the tag matching mechanism 100. For example, the transferred data may include packets 23 to be matched against the stored tagging patterns. In such embodiments, tag matching mechanism 100 may match data packets 23 with tagging patterns 21, allowing application 20 to act upon packet 23. Additionally, or alternatively, the transferred data may include portions of data packets 23, or data blocks 23B, rather than complete packets. In such embodiments, tag matching mechanism 100 may match the portions or blocks 23B of data packets with tagging patterns 21, allowing application 20 to act upon the matched packet 23 or block 23B.

For example, tagging patterns 140TP/160TP stored in tag matching mechanism 100 may pertain to data types such as Internet Protocol (IP) header patterns, IPv4 address patterns, IPv6 address patterns, protocol type patterns and port number patterns. These data types may enable tag matching mechanism 100 to perform efficient matching operations for network packet processing applications 20, where incoming data packets 23 may contain various header fields and addressing information that need to be matched against stored patterns 140TP/160TP.

For example, computing device 11 may receive MPI or IP data packets 23 from a plurality of sources, such as third-party computing devices. Application element 20 may be required to perform a unique action upon reception of a data packet from each respective source. Application 20 may therefore provide a data block 23B that includes an IP address of the source to the tag matching mechanism 100. Tag matching mechanism 100 may search through predetermined, stored tagging patterns 21 of interest, to locate a tagging pattern 21 that matches data block 23B (e.g., the source address). Tag matching mechanism 100 may subsequently return an address of the memory device 40, corresponding to the source address (which may be directly related to the address of the 160TE Tag Entry at which the match was found) where a definition of the required action may be stored. Application element 20 may then retrieve the action definition from the memory device 40 and execute the corresponding action.

In another example, application element 20 may implement a network firewall or access control system. Computing device 11 may receive network packets 23 containing various header fields such as destination port numbers, protocol types, and packet flags. Application 20 may need to determine whether each packet should be allowed, blocked, or redirected based on security policies. Application 20 may therefore provide a data block 23B that includes a combination of the destination port and protocol type to the tag matching mechanism 100. Tag matching mechanism 100 may search through predetermined, stored tagging patterns 21 representing known security rules, to locate a tagging pattern 21 that matches data block 23B. The tagging patterns 21 may include wildcard bits to match ranges of ports or multiple protocol types. The tag matching mechanism 100 may subsequently return an address of the memory device 40, corresponding to the matched security rule, where a policy action (such as "allow," "block," or "redirect to inspection queue") may be stored. Application 20 may then retrieve the policy action from the memory device 40 and process the packet accordingly, enabling high-speed packet filtering with flexible rule matching capabilities.

According to some embodiments, tag matching mechanism 100 may include a cyclic buffer 160, that may include a plurality of segments 160S, arranged in a sequence representing age. For example, cyclic buffer 160 may include an oldest segment 160SO, a second-oldest segment 160S and so on, with additional segments 160S positioned in the age sequence, ending with a newest segment 160SN. Each segment 160S of cyclic buffer 160 may include a predetermined number of tag entries 160TE. Each tag entry 160TE may be configured to store a respective tagging pattern 160TP.

Tagging patterns 160TP may represent configurations or characteristics of interest that application 20 wishes to match against incoming data. For example, in a TCAM implementation as shown in FIG. 3, tagging patterns 160TP may represent fields of content addressable data stored in memory device 40. When application 20 provides a data block 23B containing a content addressable data, tag matching mechanism 100 may search through tagging patterns 160TP to locate a matching pattern, enabling application 20 to retrieve corresponding data from memory device 40 at an address associated with the matched pattern.

The segments of cyclic buffer 160 may be organized such that their relative positions in the sequence indicate their age. In some embodiments, oldest segment 160SO may represent the segment containing the oldest tagging patterns 160TP, while newest segment 160SN may represent the segment containing the most recently inserted tagging patterns 160TP. Segments 160S between oldest segment 160SO and newest segment 160SN may be arranged in order of increasing age from newest to oldest.

As explained herein, the age sequence represents the order in which the matches are searched, with the oldest locations searched first. This tag-matching search order may be significant when more than one CAM/TCAM entry matches a portion of data block 23B, as the first-encountered match in the age-based sequence may be selected and returned. The prioritization of older entries in the tag-matching search order may ensure that patterns are processed according to their temporal precedence, which may be important for maintaining consistent behavior in applications where multiple matching patterns could potentially handle the same incoming data.

Tag matching mechanism 100 may further include an appendage buffer 140. Appendage buffer 140 may include tag entries 140TE configured to store tagging patterns 140TP. The tagging patterns 140TP stored in appendage buffer 140 may represent tagging patterns 160TP that have been evicted from cyclic buffer 160. In other words, tag entries 160TE may be evicted from cyclic buffer 160, having their tagging patterns 160TP copied into tag entries 140TE of appendage buffer 140 (now 140TP) as explained further herein, allowing these patterns to remain available for matching operations after eviction from cyclic buffer 160.

Tag matching mechanism 100 may further include a lookup engine 110 configured to match at least one portion of incoming data packets 23 against the stored tagging patterns 140TP/160TP. Lookup engine 110 may receive data packets 23 (or data blocks 23B thereof) from application 20, and may perform matching operations to locate tagging patterns 140TP/160TP that correspond to, or match the content of the incoming data packets 23.

A tagging pattern 140TP/160TP may match at least one portion of a data packet 23 or block 23B in a sense that content of the at least one portion of the data packet 23 may satisfy the pattern criteria. For example, matching may involve comparing one or more data blocks 23B of the incoming data packet 23 against the stored tagging patterns 140TP/160TP on a bit-by-bit basis.

For example, in a TCAM implementation, a tagging pattern 160TP may include an IP address pattern such as "192.168.1.*" where the asterisk represents a wildcard or "don't care" bits. An incoming data block 23B containing the IP address "192.168.1.100" may match this pattern because the first three octets match exactly and the wildcard allows any value in the fourth octet. Similarly, a tagging pattern 140TP/160TP may include mask bits that specify which portions of the data block 23B must match and which portions may be ignored during the matching operation.

At run time, lookup engine 110 may be configured to receive an incoming data packet 23 and identify at least one data block 23B of the incoming data packet to be searched. In some embodiments, the data block 23B may be identified based on predetermined criteria or header information within the data packet 23. For example, in a network packet processing application, lookup engine 110 may identify a data block 23B by extracting specific fields from the packet header, such as the source IP address field, the destination port field, or a combination of protocol type and port number fields. The identification of data block 23B may be based on the type of matching operation required by application 20, allowing lookup engine 110 to focus the search on the relevant portion of the incoming data packet 23.

Lookup engine 110 may follow a predetermined tag-matching search order when searching for matching tagging patterns. The tag-matching search order may start from tag entries 140TE of appendage buffer 140. After searching through tag entries 140TE of appendage buffer 140, lookup engine 110 may proceed to search tag entries 160TE of the segments of cyclic buffer 160. The segments of cyclic buffer 160 may be searched in order of age from oldest to newest. In some embodiments, this may mean that lookup engine 110 searches oldest segment 160SO first, followed by progressively newer segments, and finally searches newest segment 160SN last.

This tag-matching search order may provide advantages in terms of matching priority. Old tagging patterns 140TP stored in appendage buffer 140 may be matched first, followed by newer tagging patterns the oldest segment 160SO of cyclic buffer 160, through segments 160S of the cyclic buffer 160 in order of age, up to the newest tagging patterns 160TP in the newest segment 160SN.

This ordering may be viewed as implementing a fair, but biased queue structure: The structure may allow random access or selection of patterns within the queue, while biasing this randomness to maintain age-based fairness. In other words, older patterns 140TP/160TP may have higher priority in the tag-matching search order, ensuring that patterns are not excessively delayed while newer patterns continue to be inserted.

Lookup engine 110 may search appendage buffer 140 and cyclic buffer 160 following the tag-matching search order to locate a first-encountered tag entry that stores a tagging pattern which matches the data block 23B. Upon locating a matching tag entry, lookup engine 110 may generate an indication of successful match. In some embodiments, lookup engine 110 may be configured to terminate the search operation upon locating a first matching tag entry, thereby avoiding unnecessary searching of remaining segments.

For example, lookup engine 110 may output an index 110X of the located tag entry in appendage buffer 140 or cyclic buffer 160. Subsequently, lookup engine 110 may invalidate the located tag entry.

According to some embodiments, appendage buffer 140 may itself be implemented as a cyclical memory buffer, similar in structure to cyclic buffer 160. In such embodiments, appendage buffer 140 may comprise a plurality of segments arranged in a sequence representing age, where each segment includes tag entries configured to store tagging patterns. Appendage buffer 140 may further include its own, smaller appendage buffer for storing tagging patterns evicted from its oldest segment.

In some embodiments, the recursive structure may extend to multiple levels, where each appendage buffer in the hierarchy may itself include a cyclical buffer structure with its own smaller appendage buffer. The depth of this recursive hierarchy may be predetermined based on system requirements, such as the expected number of tagging patterns to be stored, the desired granularity of age-based organization, or the available hardware resources.

Lookup engine 110 may be configured to search through the recursive appendage buffer structure following the tag-matching search order. For example, lookup engine 110 may first search the smallest (and oldest) appendage buffer in the hierarchy, followed by progressively larger appendage buffers, and finally the segments of cyclic buffer 160 from oldest to newest. This search order may ensure that the oldest tagging patterns across all hierarchical levels are matched first, maintaining the age-based priority throughout the recursive structure.

Control circuit 120 may manage the recursive appendage buffer architecture by coordinating eviction and rotation operations at each level of the hierarchy. In some embodiments, control circuit 120 may initiate eviction at a particular level of the hierarchy when the corresponding buffer approaches a predetermined occupancy threshold, similar to the eviction process described herein for cyclic buffer 160.

Figure 4A:
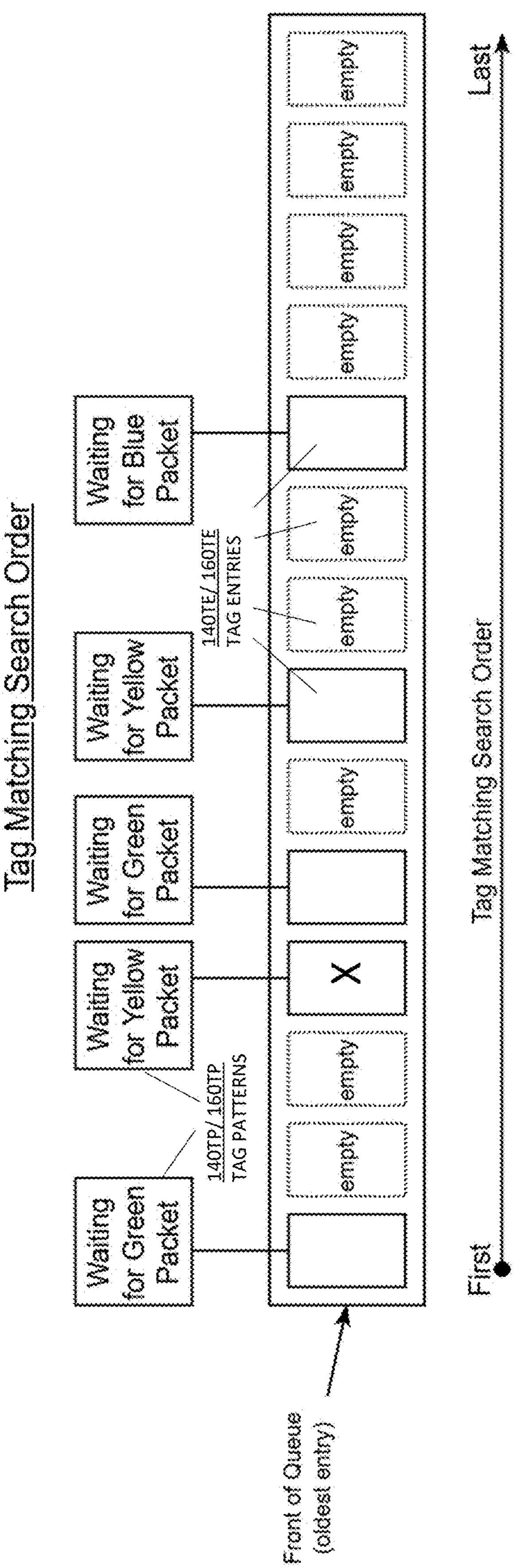
FIGS. 4A-4D are schematic diagrams illustrating the tag-matching search order and vacant entry search order, according to some embodiments of the invention.

Reference is now made to FIG. 4A, which is a schematic diagram illustrating the tag-matching search order among entries 140TE of appendage buffer 140 and/or entries 160TE of cyclic buffer 160, according to some embodiments of the invention.

As shown in the example of FIG. 4A, lookup engine 110 may receive a portion or block 23B of a data packet 23, pertaining to specific data type. In this example, the data is denoted as "color" data, such as "yellow", "green" etc. Lookup engine 110 may follow the tag-matching search order, marked by an arrow in FIG. 4A, starting from tag entries 140TE of appendage buffer 140, followed by tag entries 160TE of the segments of cyclic buffer 160 in order of age from oldest segment 160SO to newest segment 160SN.

During the search, lookup engine 110 may disregard invalid or vacant (denoted "empty") entries that do not store valid tagging patterns. Lookup engine 110 may continue searching until identifying a first-encountered tag entry 140TE/160TE that stores a tagging pattern 140TP/160TP matching the incoming data block 23B. In the example of FIG. 4A, the matching tagging pattern corresponds to the "yellow" color data.

Upon locating the matching tag entry, lookup engine 110 may output an index 110X of the identified or matched entry, denoted in FIG. 4A by 'X'. Lookup engine 110 may subsequently invalidate the matched tag entry, thereby making it vacant and available for subsequent data insertion. This invalidation may ensure that the matched entry is removed from the queue and can be reused for storing new tagging patterns 21 received from application element 20.

In some embodiments, invalidation may be implemented by setting a validity flag or status bit associated with the tag entry to indicate that the entry is no longer valid. Alternatively, invalidation may involve clearing or overwriting the tagging pattern stored in the tag entry, or marking the entry as available for reuse in a status register maintained by control circuit 120.

According to some embodiments, the selection and subsequent invalidation of a matching entry may strictly follow the tag-matching search order. In such embodiments, lookup engine 110 may select the first-encountered matching entry 140TE/160TE according to the tag-matching search order from oldest to newest, output the index 110X of that entry, and invalidate the selected entry. This approach may ensure deterministic behavior where the oldest matching entry is always selected.

Alternatively, the selection and invalidation of a matching entry may include a biased and/or random aspect. For example, upon finding a matching entry 140TE/160TE, lookup engine 110 may implement a random decision function (e.g., "flip a coin") to determine whether to select the matched entry for extraction and invalidation. In some embodiments, this random decision function may operate as a probabilistic gate that determines whether to output index 110X and invalidate the matched entry 140TE/160TE, or to continue searching for additional matching entries.

Additionally, or alternatively, the random decision function may be biased, e.g., in favor of older entries. For example, a matched entry located in oldest segment 160SO may have a higher probability of being selected for outputting index 110X and subsequent invalidation, while a matched entry located in newest segment 160SN may have a lower probability of selection. In one example, a matched entry in oldest segment 160SO may have a 90% chance of being selected to have its index 110X extracted (and subsequently invalidated), while a matched entry in newest segment 160SN may have a 10% chance of being selected. Entries in intermediate segments 160S may have selection probabilities that vary according to their relative age in the sequence.

This biased random selection approach may provide flexibility in managing the queue while still maintaining a preference for processing older entries, thereby balancing fairness with the ability to accommodate varying application requirements.

In some embodiments, tagging pattern 140TP/160TP may also include error detection indicators. For example, tagging pattern 140TP/160TP may include parity bits configured to provide a deterministic parity across all bits in the tagging pattern 140TP/160TP. Alternatively, tagging pattern 140TP/160TP may include additional bits carrying an Error Correcting Code (ECC), such as Hamming Single Error Correction Double Error Detection (SECDED), to provide error correction coverage for all bits of tagging pattern 140TP/160TP.

According to some embodiments, tag matching mechanism 100 may be configured to utilize the error detection indicators included in tagging patterns 140TP/160TP during matching operations. When lookup engine 110 performs matching operations against stored tagging patterns, lookup engine 110 may verify the integrity of the tagging patterns using the parity bits or ECC data. For example, lookup engine 110 may calculate the parity of a retrieved tagging pattern 140TP/160TP and compare it against the stored parity bits to detect potential data corruption.

In embodiments where tagging patterns 140TP/160TP include ECC data such as Hamming SECDED, lookup engine 110 may be configured to detect and correct single-bit errors in the tagging patterns before performing the matching operation. When a correctable error is detected, lookup engine 110 may correct the error and proceed with the matching operation using the corrected tagging pattern. In cases where uncorrectable errors are detected, lookup engine 110 may invalidate the corrupted tag entry and report the error condition to control circuit 120.

This error detection and correction capability may enhance the reliability of tag matching mechanism 100 by ensuring that matching operations are performed against valid tagging patterns, thereby preventing false matches or missed matches that could result from data corruption in appendage buffer 140 or cyclic buffer 160.

In some embodiments, lookup engine 110 may include one or more (e.g., a plurality of) lookup heads 110H that enable concurrent search operations at different locations of appendage buffer 140 and/or cyclic buffer 160. Additionally, or alternatively, a plurality of lookup heads 110H may facilitate simultaneous search operations across multiple tag entries 140TE/160TE. Lookup engine 110 may consolidate the results of these concurrent search operations into a single overall search result. For example, when multiple lookup heads 110H locate matching tag entries simultaneously, lookup engine 110 may select the oldest matching entry according to the tag-matching search order as the single overall search result. Lookup engine 110 may subsequently invalidate only the selected (e.g., oldest) matching entry 140TE/160TE, while other matching entries located by the concurrent search operations may remain valid and available for future matching operations.

Tag matching mechanism 100 may further include a control circuit 120 configured to manage the operation of cyclic buffer 160 and appendage buffer 140. In some embodiments, control circuit 120 may be configured to evict tag entries 160TE from a current oldest segment 160SO of cyclic buffer 160 to appendage buffer 140, as shown by the bold arrow of FIG. 3.

In this process, control circuit 120 may evict tag entries 160TE from oldest segment 160SO by copying their tagging patterns 160TP into available (e.g., vacant or invalidated) tag entries 140TE in appendage buffer 140, according to a vacancy search order. Control circuit 120 may subsequently invalidate the evicted tag entries 160TE in the current oldest segment 160SO of cyclic buffer 160.

According to some embodiments, prior to evicting tag entries 160TE from the current oldest segment 160SO of cyclic buffer 160 to appendage buffer 140, control circuit 120 may be configured to compress content of appendage buffer 140. Compression may involve omitting gaps of invalidated tag entries within appendage buffer 140, thereby consolidating the valid tag entries 140TE and creating contiguous available space. In some embodiments, control circuit 120 may identify invalidated tag entries 140TE in appendage buffer 140 and may shift or relocate valid tag entries to eliminate gaps between them. This compression process may make room for the tag entries to be evicted from oldest segment 160SO.

According to some embodiments, memory access manager 130 may further maintain a shadow buffer 170. Shadow buffer 170 may be implemented as a shadow structure such as an SRAM or similar memory device, and may be maintained as tagging operations proceed.

Control circuit 120 may be configured to maintain synchronization between shadow buffer 170 and cyclic buffer 160 and/or appendage buffer 140. In some embodiments, control circuit 120 may monitor updates to tag entries 140TE/160TE in cyclic buffer 160 and appendage buffer 140, and may propagate corresponding changes to shadow buffer 170 to ensure data consistency.

For example, when a tag entry 140TE/160TE is invalidated by lookup engine 110 following a successful match, control circuit 120 may update the corresponding entry in shadow buffer 170 to reflect the invalidated status. Similarly, when new tagging patterns 21 are stored in tag entries 140TE/160TE, control circuit 120 may record the corresponding tagging patterns and validity status in shadow buffer 170.

Shadow buffer 170 may enable control circuit 120 to perform controlled eviction of tag entries 160TE from the current oldest segment 160SO of cyclic buffer 160. In some embodiments, control circuit 120 may trigger the eviction process by reading valid tag entry patterns 160TP from shadow buffer 170 and using these patterns as data to be looked up in cyclic buffer 160. Because the patterns read from shadow buffer 170 correspond to valid tag entries 160TE in oldest segment 160SO, the lookup operation may provide a guaranteed match and subsequent invalidation of the corresponding tag entries 160TE in cyclic buffer 160. Control circuit 120 may use the matched patterns read from shadow buffer 170 to populate appendage buffer 140, thereby completing the eviction process.

The shadow buffer approach may also provide advantages in terms of off-line preparation of compression operations for appendage buffer 140. Because shadow buffer 170 maintains a duplicate record of tag entries and their validity status, control circuit 120 may analyze the content of shadow buffer 170 to prepare compression operations in advance, without interfering with active tagging operations being performed by lookup engine 110 on appendage buffer 140 and cyclic buffer 160. This off-line preparation may reduce latency during eviction and rotation operations, as control circuit 120 may pre-calculate the target positions for evicted tag entries 160TE and the sequence of data movements required for compression of appendage buffer entries 140TE. Additionally, by performing preparatory operations on shadow buffer 170 rather than directly on appendage buffer 140, system 10 may maintain higher throughput for incoming data packets 23 during periods of buffer management activity.

Figure 4B:
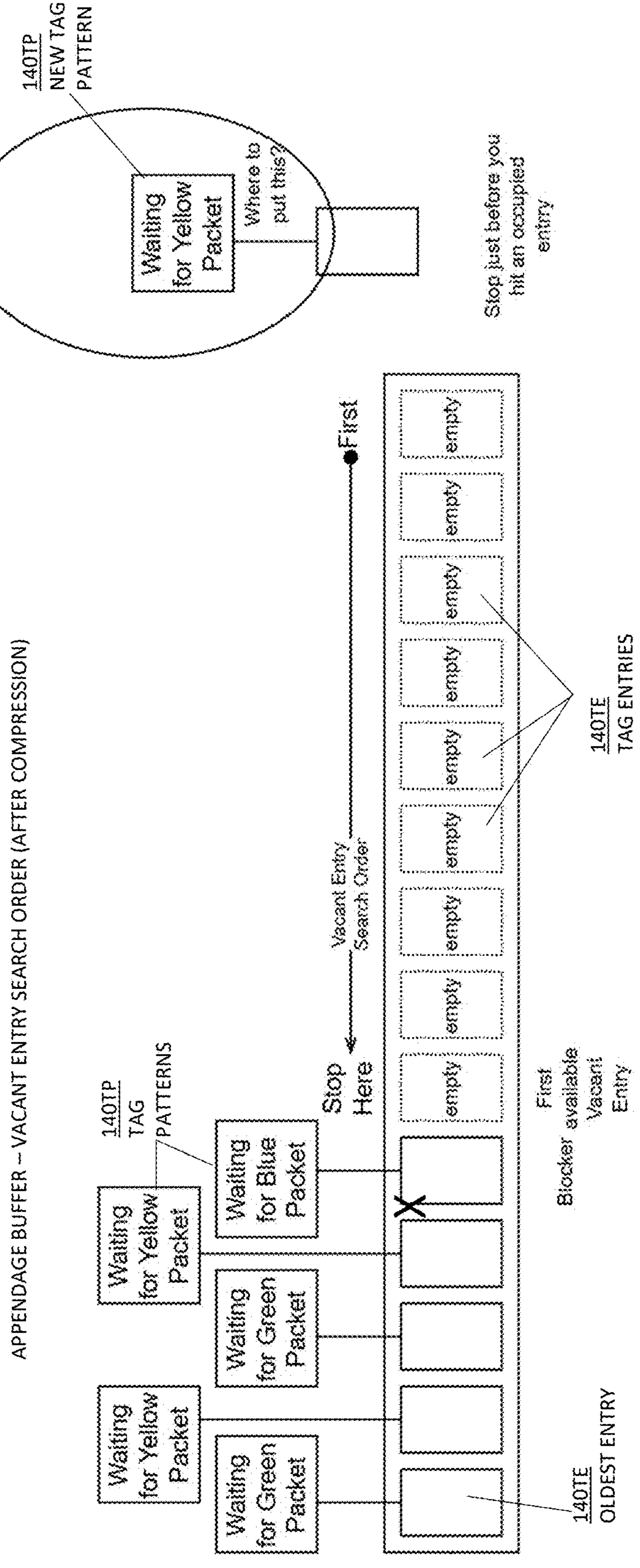

Reference is now made to FIG. 4B, which is a schematic diagram illustrating the vacancy search order among entries 140TE of appendage buffer 140, following compression of appendage buffer 140, according to some embodiments of the invention.

As shown in the example of FIG. 4B, entries of appendage buffer 140 may be compressed so as to populate the oldest entries (e.g., lowest indices) in appendage buffer 140. This compression may consolidate valid tag entries 140TE by omitting gaps of invalidated entries, thereby creating contiguous available space for new tagging patterns.

Lookup engine 110 may receive a new tagging pattern (e.g., tagging pattern 21 from application element 20 or tagging pattern 160TP evicted from cyclical buffer 160), and may search for the first vacant location following a vacancy search direction marked by the arrow in FIG. 4B. The vacancy search direction may be substantially opposite the tag-matching search direction. In other words, the vacancy search direction may proceed from newest to oldest entry, whereas the tag-matching search direction proceeds from oldest to newest entry.

Lookup engine 110 may return a pointer or index of the last vacant entry 140TE (marked 'X') along the vacancy search, which in this case is also the first vacant entry along the tag-matching search direction. Lookup engine 110 or control circuit 120 may subsequently store the introduced tagging pattern 21/160TP as tagging pattern 140TP in the indexed entry 140TE. This approach may ensure that new tagging patterns are inserted at positions that maintain the age-based organization of appendage buffer 140.

Returning to FIG. 3, after evicting tag entries from the current oldest segment 160SO, control circuit 120 may be configured to rotate cyclic buffer 160 to redefine the oldest segment, as shown by the striped arrow of FIG. 3. Rotation of cyclic buffer 160 may involve reassigning the age designations of the segments 160S, without physically relocating entries 160TE between segments of the cyclic buffer.

In some embodiments, after the eviction and rotation, the segment that was previously oldest segment 160SO may now become a vacant, newly assigned newest segment 160NS. Additionally, the second-oldest segment may become the new oldest segment 160SO, the third-oldest segment may become the new second-oldest segment 160S, and so on. This rotation process may allow cyclic buffer 160 to continuously accommodate new tagging patterns in newest segment 160SN while maintaining the age-based organization of segments.

As elaborated herein, control circuit 120 may maintain status metadata 123 that tracks the state of tag entries 140TE/160TE in cyclic buffer 160 and appendage buffer 140, and may issue commands 121 to coordinate the eviction and rotation operations. Additionally, control circuit 120 may also provide telemetry 125 information that can be used for monitoring and optimizing the performance of tag matching mechanism 100.

According to some embodiments, control circuit 120 may accumulate telemetry data 125 based on status metadata 123. Telemetry data 125 may provide information about the operational characteristics and performance of tag matching mechanism 100, enabling application 20, operating system 30, or other system components to monitor and optimize system 10 behavior.

Telemetry data 125 may include various metrics related to the operation of tag matching mechanism 100. For example, telemetry data 125 may include a count of the number of searches performed by lookup engine 110 over a predetermined time period. This metric may indicate the overall activity level of tag matching mechanism 100 and may be used to assess system utilization.

Additionally, or alternatively, telemetry data 125 may include a count of the number of searches that produced no match. This metric may indicate situations where incoming data packets 23 do not correspond to any stored tagging patterns 140TP/160TP, which may suggest that application 20 needs to register additional tagging patterns or that incoming traffic patterns have changed.

Telemetry data 125 may further include an occupancy rate of oldest segment 160SO during the last eviction process. This metric may indicate how efficiently the cyclic buffer 160 is being utilized and may help control circuit 120 or application 20 determine optimal timing for future eviction operations.

In some embodiments, telemetry data 125 may include a histogram of time intervals between cyclic buffer rotations. This histogram may provide insight into the rate at which tagging patterns are being inserted and matched, and may enable application 20 to identify patterns in system workload over time.

Telemetry data 125 may also include a number of hits, representing successful matches between incoming data packets 23 and stored tagging patterns 140TP/160TP. A high number of hits may indicate heavy workload on tag matching mechanism 100, while a low number of hits may indicate reduced activity.

Application 20 or operating system 30 may analyze telemetry data 125 to make operational decisions regarding system 10 resources. For example, application 20 may analyze telemetry data 125 to determine the current workload on tag matching mechanism 100. Based on the calculated workload, application 20 may select to power up additional hardware modules, such as additional TCAM engines or lookup heads 110H, to handle increased demand. Conversely, when telemetry data 125 indicates reduced workload, application 20 may select to shut down or place into a low-power state one or more hardware modules to conserve energy.

Additionally, or alternatively, application 20 may use telemetry data 125 to adjust the rate at which new tagging patterns 21 are registered, to modify the predetermined occupancy threshold used by control circuit 120 for initiating eviction operations, or to tune other operational parameters of tag matching mechanism 100. This feedback mechanism may enable dynamic optimization of tag matching mechanism 100 based on observed operational characteristics.

As part of copying tagging patterns 160TP into available tag entries 140TE in appendage buffer 140, control circuit 120 may analyze the tagging patterns for errors using error detection and error correction techniques such as parity and ECC as previously mentioned. Where ECC codes are used, detected errors may be corrected during the copying process. Additionally, where tagging patterns for tag entries 140TE are fetched from a Shadow Memory, the data in Shadow Memory may be protected by ECC and thus may be unlikely to contain errors.

Use of these error detection and correction techniques as part of copying tagging patterns 160TP into appendage buffer 140 may address cases where tagging patterns 160TP in cyclic buffer 160 have become corrupted due to bit-level errors without requiring that the entries of cyclic buffer 160 be corrected during the search process, simplifying the overall design. Such corrupted patterns may have aged beyond expectations because the erroneous tagging pattern 21 may fail to match any incoming data blocks 23B, causing the corrupted entries to remain in the system longer than intended and potentially becoming "dinosaur" entries that consume valuable storage space without serving their intended matching function.

According to some embodiments, control circuit 120 (FIG. 3) may be configured to continuously receive incoming tagging patterns 21 from application 20. Each incoming tagging pattern 21 may represent a respective configuration of interest in a process of application 20. For example, application 20 may generate tagging patterns 21 that correspond to IP addresses, port numbers, protocol types, or other data fields that application 20 needs to match against incoming data packets 23.

For each incoming tagging pattern 21, control circuit 120 may employ lookup engine 110 to locate a first-encountered vacant entry along a vacancy search order, starting from newest segment 160SN of cyclic buffer 160. In some embodiments, lookup engine 110 may search through tag entries 160TE of newest segment 160SN, subsequent segments 160S and appendage buffer 140, following the vacancy search order to identify a vacant or available tag entry 160TE. A vacant entry may be a tag entry 160TE that does not currently store a valid tagging pattern 160TP, or a tag entry 160TE that has been invalidated and is vacant or available for reuse.

Alternatively, control circuit 120 may identify vacant or available tag entries 160TE by consulting a status register maintained by control circuit 120, where entries are marked as available for reuse following invalidation. Additionally, or alternatively, control circuit 120 may utilize shadow buffer 170 to identify the first invalid entry, as shadow buffer 170 maintains a duplicate record of tag entries 160TE including their validity status. Additionally, or alternatively, control circuit 120 may count the number of tagging patterns 21 inserted into newest segment 160SN following rotation of cyclic buffer 160, when newest segment 160SN was completely vacant. Control circuit 120 may use this count to determine the next available entry position within newest segment 160SN, and may write incoming tagging patterns 21 into entries of that segment according to the count.

Once control circuit 120 locates a vacant entry in segment 160S or appendage buffer 140, control circuit 120 may store the incoming tagging pattern 21 as tagging pattern 160TP/140TP in the located vacant entry 160TE/140TE. Tag matching mechanism 100 may thereby maintain the age-based organization of cyclic buffer 160, where newest segment 160SN contains the most recently inserted patterns and oldest segment 160SO contains the oldest patterns in cyclic buffer 160, and appendage buffer 140 contains the oldest patterns in tag matching mechanism 100.

Figure 4C:
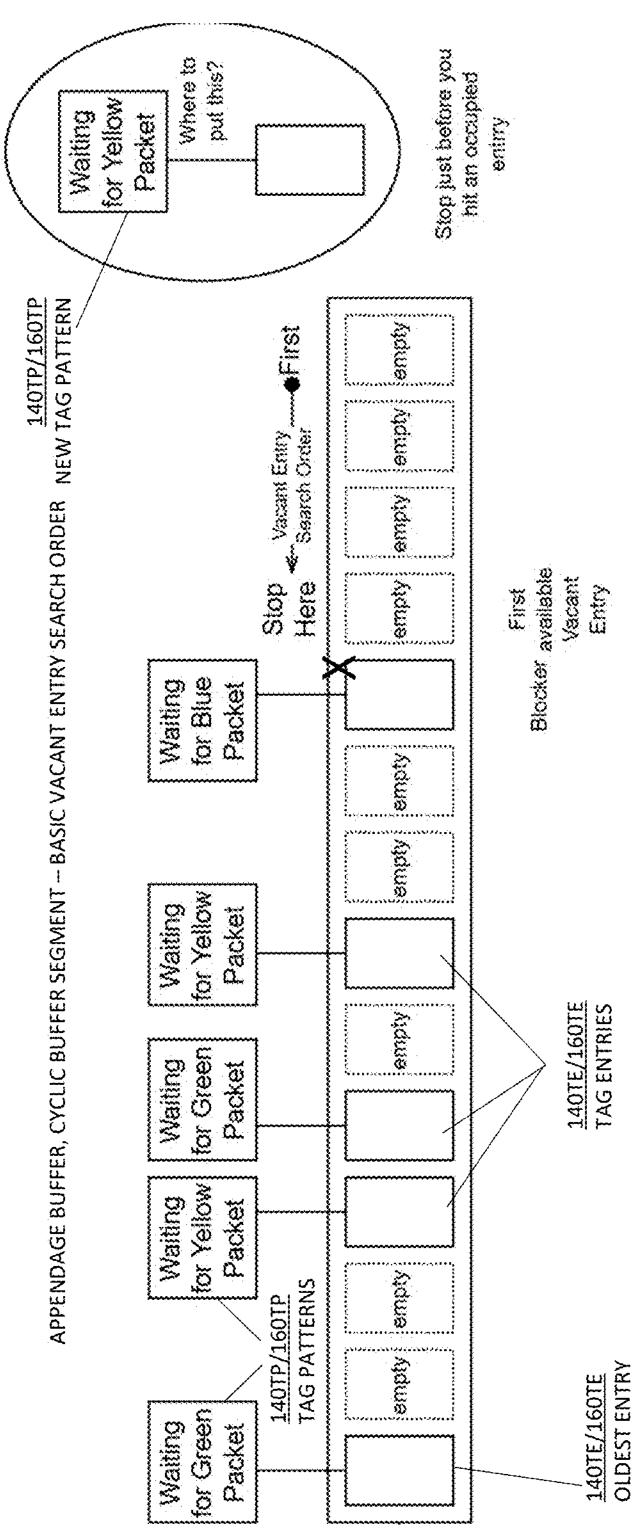

Reference is now made to FIG. 4C, which is a schematic diagram illustrating the vacancy search order among entries 140TE of appendage buffer 140 and entries 160TE of cyclic buffer segments 160S, according to some embodiments of the invention.

As shown in the example of FIG. 4C, lookup engine 110 may receive a new tagging pattern 21 from application element 20, and may search for the first vacant location following the vacancy search order marked by the arrow. The vacancy search order may be substantially opposite the tag-matching search order. In other words, the vacancy search order may proceed from the newest entry 160TE of newest segment 160SN, via intermediate segments 160S, to the oldest entry 160TE of oldest segment 160SO, and finally to the entries 140TE of appendage buffer 140, from newest to oldest.

Lookup engine 110 may return a pointer or index of the last vacant entry 140TE/160TE along the vacancy search order, marked with 'X' in FIG. 4C. This located vacant entry 140TE/160TE may not necessarily be the first vacant entry along the tag-matching search order, as the vacancy search proceeds in the opposite direction. In other words, lookup engine 110 may return the index 110X of the last vacant entry along the vacancy search order (e.g., from newest to oldest), that is followed by a non-vacant entry.

Lookup engine 110 or control circuit 120 may subsequently store the newly introduced tagging pattern 21 in the indexed entry 140TE/160TE. When the vacant entry is located in cyclic buffer 160, the tagging pattern 21 may be stored as tagging pattern 160TP. When the vacant entry is located in appendage buffer 140, the tagging pattern 21 may be stored as tagging pattern 140TP.

Figure 4D:
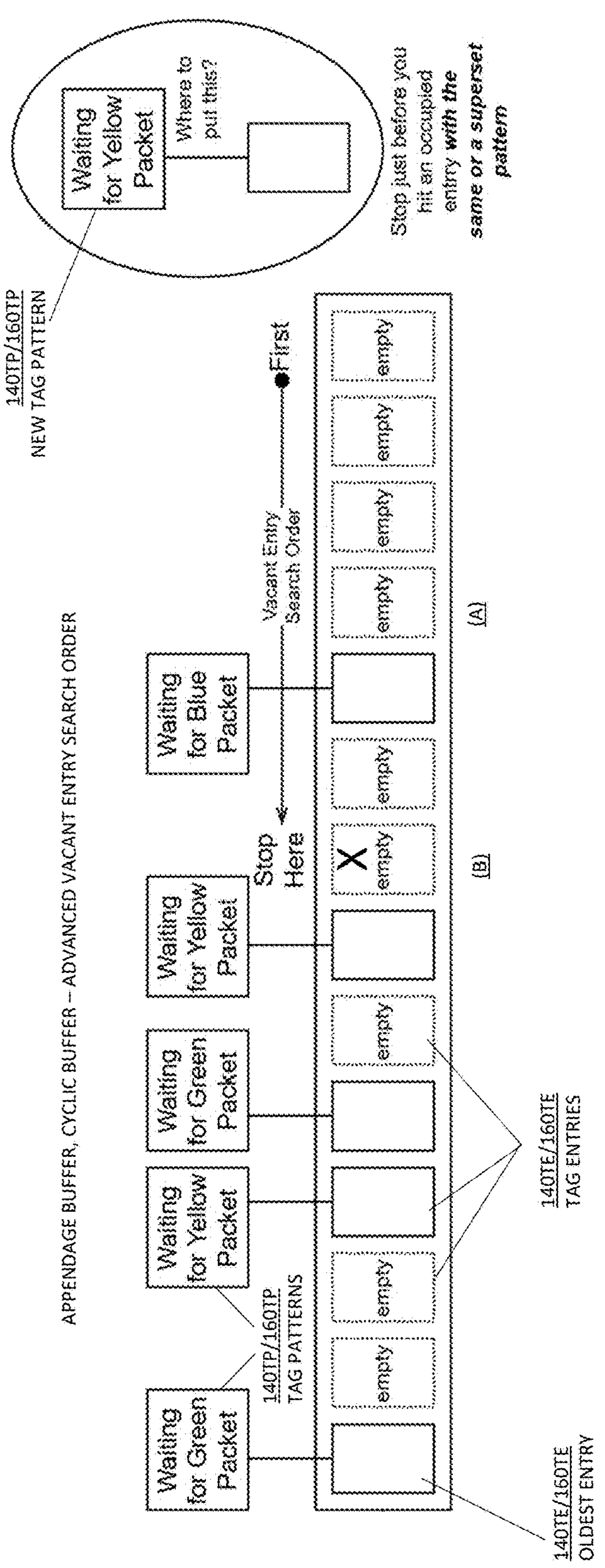

Reference is now made to FIG. 4D, which is a schematic diagram illustrating the vacancy search order among entries 140TE of appendage buffer 140 and entries 160TE of cyclic buffer segments 160S, according to some embodiments of the invention.

As shown in the example of FIG. 4D, lookup engine 110 may receive a new tagging pattern 21 from application element 20, and may search for the first vacant location following a vacancy search order marked by the arrow. Unlike the example of FIG. 4C, lookup engine 110 may be configured to return a pointer or index of the last vacant entry 140TE/160TE along the vacancy search order, which is positioned just before an entry that maintains a matching or superseding pattern.

In this example, tagging pattern 21 pertains to a "yellow" data packet. During the vacancy search, lookup engine 110 may "hop" over the entry 140TE/160TE marked 'A' in FIG. 4D, because its following entry in the vacancy search order maintained a "blue" pattern that does not match the incoming tagging pattern 21. Lookup engine 110 may proceed along the vacancy search order, evaluating subsequent vacant entries and their following entries' patterns.

Lookup engine 110 may return the index 110X of the entry 140TE/160TE marked 'B' in FIG. 4D, because its following entry 140TE/160TE in the vacancy search order maintained a matching "yellow" pattern. By inserting the new tagging pattern 21 after all existing matching patterns, this approach may preserve the logical grouping of related patterns within the queue structure. Lookup engine 110 or control circuit 120 may subsequently store the newly introduced tagging pattern 21 in the indexed entry 140TE/160TE as tagging pattern 140TP or 160TP respectively.

This pattern-aware vacancy search may enable tag matching mechanism 100 to maintain coherent ordering of related tagging patterns, which may be beneficial for applications where patterns with similar characteristics should be processed in proximity to one another.

As new tagging patterns 21 are continuously inserted as tagging patterns 160TP into newest segment 160SN, older tagging patterns 160TP may gradually migrate with their segments 160S toward oldest segment 160SO, and eventually be evicted to appendage buffer 140 (now as tagging patterns 140TP) by control circuit 120.

According to some embodiments, control circuit 120 may be configured to initiate eviction of oldest segment 160SO, to accommodate influx of tagging patterns 21 into cyclic buffer 160 (as tagging patterns 160TP). Control circuit 120 may aggregate metadata 123 associated with one or more (e.g., each) tag entry in cyclic buffer 160 and appendage buffer 140 (160TE/140TE respectively).

As shown in FIG. 3, control circuit 120 may maintain status metadata 123 that includes information about the tag entries 160TE/140TE. The metadata associated with each tag entry may include, for example, an insertion timestamp, a priority level, a validity status, and the like.

For example, the insertion timestamp may indicate when a tagging pattern was stored in a particular tag entry. The priority level may reflect the importance or urgency of the tagging pattern. The validity status may indicate whether the tag entry currently stores a valid tagging pattern or has been invalidated.

In some embodiments, control circuit 120 may be configured to determine that the newest segment 160SN of cyclic buffer 160 is expected to approach a predetermined occupancy level threshold within a predetermined timeframe, based on the aggregated metadata. For example, control circuit 120 may analyze the insertion timestamps of recently added tagging patterns to calculate a rate of insertion into newest segment 160SN. Based on this rate and the current occupancy level of newest segment 160SN, control circuit 120 may project when the newest segment 160SN will reach the predetermined occupancy level threshold. The predetermined occupancy level threshold may represent a percentage or absolute number of occupied tag entries in newest segment 160SN, such as 80% occupancy or a specific number of filled tag entries. The predetermined timeframe may represent a time window within which control circuit 120 evaluates whether the occupancy threshold will be reached.

Control circuit 120 may subsequently initiate compression of appendage buffer 140, followed by eviction of tag entries from the oldest segment 160SO to appendage buffer 140, and subsequent rotation of cyclic buffer 160, in accordance with said determination. For example, when control circuit 120 determines that newest segment 160SN is expected to approach the predetermined occupancy level threshold within the predetermined timeframe, control circuit 120 may proactively trigger the eviction process to free up space in cyclic buffer 160. This may allow control circuit

120 to maintain sufficient available capacity in newest segment 160SN for incoming tagging patterns 21 from application 20, preventing overflow conditions and ensuring continuous operation of tag matching mechanism 100.

According to some embodiments, tagging patterns 21 may pertain to, or be associated with application element 20 or software processes or threads issued by application element 20. An operating system 30 of computing device 11 may keep track of process metadata 31 representing aspects of these processes. Process metadata 31 may reflect the status of the processes (e.g., active, terminated, or stalled), their priorities, and their corresponding installations of tagging patterns 21 in tag entries 140TE and 160TE (140TP/160TP respectively). As explained herein, this association between processes and tagging patterns 21/160TP/140TP may enable application 20 and/or OS 30 to manage and update patterns based on the lifecycle and state of the processes that generated them.

In some embodiments, application 20 may be configured to identify obsolete tag entries pertaining to a terminated process based on the maintained association between processes and tag entries. For example, when a process terminates, application 20 may consult process metadata 31 to determine which tag entries 140TE/160TE in appendage buffer 140 or cyclic buffer 160 are associated with the terminated process. Application 20 may then issue a purge command, by transmitting a synthetic packet 33 that includes a data block 23B having content that matches the tagging patterns 140TP/160TP of the obsolete tag entries. When lookup engine 110 receives the synthetic packet 33, lookup engine 110 may locate one or more matching tag entries following the tag-matching search order and may invalidate them, thereby freeing the tag entries for reuse and preventing obsolete patterns from consuming storage space in tag matching mechanism 100.

Additionally, or alternatively, application 20 or control circuit 120 may be configured to identify and evict tag entries that have aged beyond a predetermined threshold, sometimes referred to as "dinosaur" entries.

For example, control circuit 120 may analyze status metadata 123, such as insertion timestamps associated with tag entries 140TE in appendage buffer 140, to identify tag entries that have remained in the system longer than expected (e.g., beyond a predetermined time period) without being matched. In some embodiments, control circuit 120 may determine that a tag entry 140TE has become a "dinosaur" entry when its insertion timestamp indicates an age exceeding a predetermined age threshold, regardless of whether the associated process has terminated. Upon identifying one or more dinosaur entries, control circuit 120 may generate and transmit a synthetic packet 33 that includes a data block 23B having content that matches the tagging patterns 140TP of the identified dinosaur entries. When lookup engine 110 receives the synthetic packet 33, lookup engine 110 may locate the matching dinosaur entries following the tag-matching search order and may invalidate them, thereby freeing the tag entries 140TE for reuse. This mechanism may prevent entries from consuming storage space indefinitely in appendage buffer 140, even when the associated process remains active and holds other valid tag entries in the system. In some embodiments, control circuit 120 may notify application 20 or operating system 30 when dinosaur entries are evicted, enabling the associated process to take corrective action such as re-registering the evicted tagging patterns if they are still required.

Figure 5:
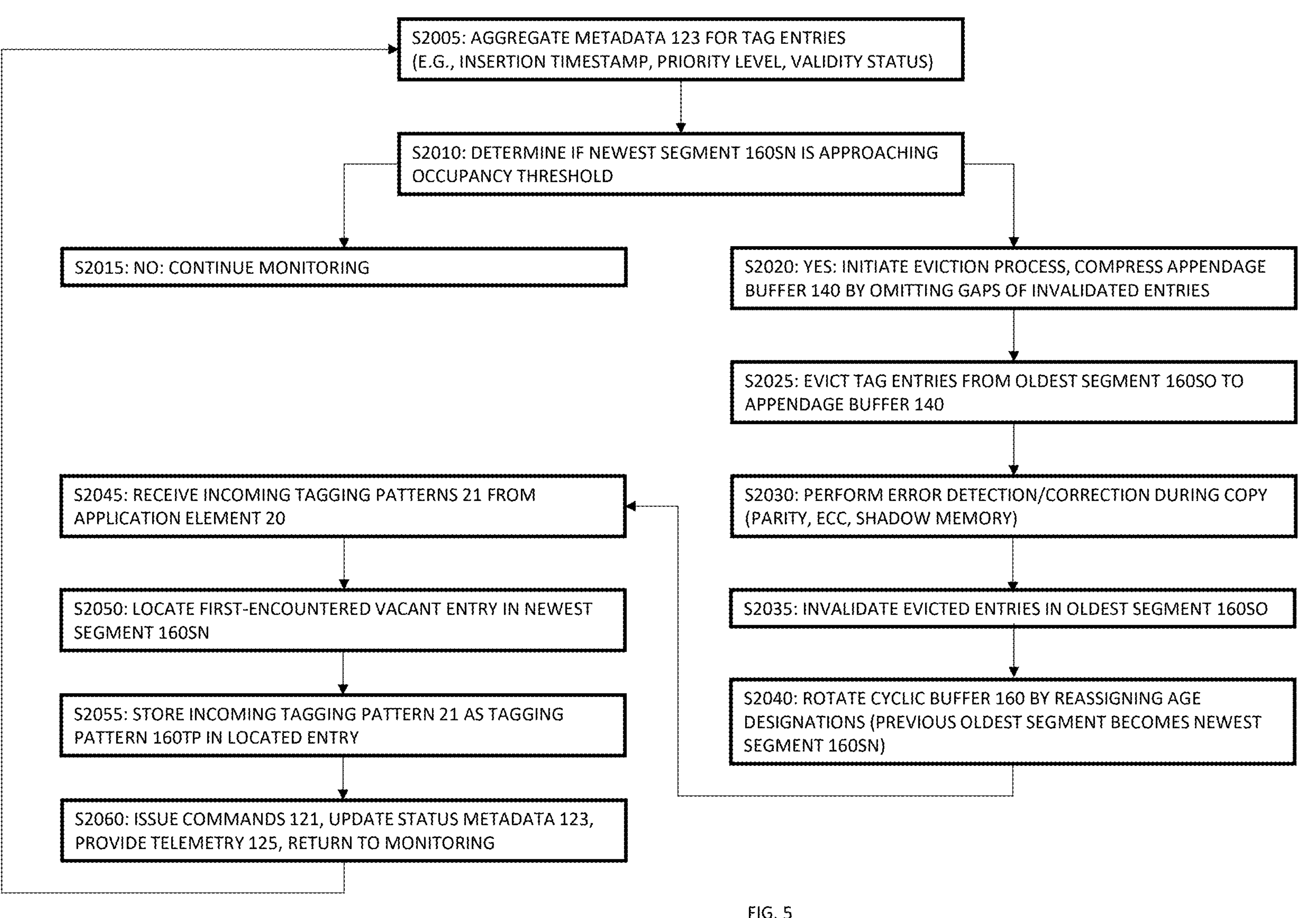
FIG. 5 is a flowchart illustrating the operation of a control circuit for managing components of the tag matching mechanism, according to some embodiments of the invention.

Reference is now made to FIG. 5, which is a flowchart illustrating the operation of control circuit 120 for managing components of the tag matching mechanism 100 (e.g., cyclic buffer 160, appendage buffer 140), according to some embodiments of the invention. Control circuit 120 may be the same as control circuit 120 of FIG. 3. As shown in FIG. 5, control circuit may operate continuously, e.g., as in a loop, continuously monitoring and managing tag matching mechanism.

According to some embodiments of the invention, control circuit 120 may be implemented as a software module, a hardware module, or any combination thereof. For example, system may be or may include a computing device such as element 1 of FIG. 1, and may be adapted to execute one or more modules of executable code (e.g., element 5 of FIG. 1) to manage components of the tag matching mechanism 100, as further described herein. Additionally, or alternatively, control circuit 120 may be implemented in hardware.

In step S2005, control circuit 120 may aggregate metadata 123 associated with tag entries in cyclic buffer 160 and appendage buffer 140. As shown in FIG. 3, control circuit 120 may maintain status metadata 123 that includes, for example, information about each tag entry 140TE/160TE, such as insertion timestamps indicating when tagging patterns were stored, priority levels reflecting the importance of tagging patterns, and validity status indicating whether tag entries currently store valid tagging patterns or have been invalidated.

In step S2010, control circuit 120 may determine whether the newest segment 160SN of cyclic buffer 160 is approaching a predetermined occupancy threshold. As explained herein, control circuit 120 may analyze the aggregated metadata 123 to calculate a rate of insertion of tagging patterns 21 from application 20 into newest segment 160SN. Based on this rate and the current occupancy level of newest segment 160SN, control circuit 120 may project whether the newest segment 160SN will reach the predetermined occupancy level threshold within a predetermined timeframe (e.g., a timeframe required for compression of appendage buffer 140).

In step S2015, if control circuit 120 determines that the newest segment 160SN is not approaching the occupancy threshold, control circuit 120 may continue monitoring the status of cyclic buffer 160 and appendage buffer 140. Control circuit 120 may periodically repeat steps S2005 and S2010 to evaluate whether eviction is required.

In step S2020, if control circuit 120 determines that the newest segment 160SN is approaching the occupancy threshold, control circuit 120 may initiate the eviction process by first compressing appendage buffer 140. As explained herein, control circuit 120 may identify invalidated tag entries 140TE within appendage buffer 140 and may shift or relocate valid tag entries to eliminate gaps between them. This compression process may consolidate valid tag entries 140TE and create contiguous available space to accommodate tag entries to be evicted from oldest segment 160SO.

In step S2025, control circuit 120 may evict tag entries 160TE from the current oldest segment 160SO of cyclic buffer 160 to appendage buffer 140. Control circuit 120 may copy tagging patterns 160TP from tag entries 160TE in oldest segment 160SO into available tag entries 140TE in appendage buffer 140, according to the vacancy search order. The evicted tagging patterns 160TP may become tagging patterns 140TP stored in appendage buffer 140.

In step S2030, as part of copying tagging patterns 160TP into appendage buffer 140, control circuit 120 may perform error detection and/or correction operations. Control circuit 120 may analyze the tagging patterns for errors using error detection techniques such as parity verification, or error correction techniques such as Error Correcting Code (ECC). Where ECC codes are used, detected errors may be corrected during the copying process. Additionally, or alternatively, where tagging patterns are fetched from a shadow memory, the data in shadow memory may be protected by ECC and may therefore be considered unlikely to contain errors.

In step S2035, control circuit 120 may invalidate the evicted tag entries 160TE in the current oldest segment 160SO of cyclic buffer 160. Control circuit 120 may, for example, set validity flags or status bits associated with the evicted tag entries 160TE to indicate that these entries are no longer valid and are vacant or available for reuse.

In step S2040, control circuit 120 may rotate cyclic buffer 160 by reassigning age designations to the segments 160S. Control circuit 120 may perform this rotation without physically relocating entries 160TE between segments of cyclic buffer 160: The segment that was previously designated as oldest segment 160SO may now become a vacant, newly assigned newest segment 160SN. The segment that was previously designated as second-oldest may become the new oldest segment 160SO, and so on through the sequence of segments 160S.

In step S2045, control circuit 120 may receive incoming tagging patterns 21 from application element 20. Application 20 may generate and transmit tagging patterns 21 to tag matching mechanism 100. Each incoming tagging pattern 21 may represent a respective configuration or characteristic of interest in a process of application element 20.

In step S2050, control circuit 120 may locate a first-encountered vacant entry in newest segment 160SN of cyclic buffer 160. Control circuit 120 may employ lookup engine 110 to search through tag entries 160TE of newest segment 160SN following the vacancy search order to identify a vacant or available tag entry 160TE. A vacant entry may be a tag entry 160TE that does not currently store a valid tagging pattern 160TP, or a tag entry 160TE that has been invalidated and is therefore vacant or available for reuse.

In step S2055, control circuit 120 may store the incoming tagging pattern 21 as tagging pattern 160TP in the located vacant entry 160TE. By inserting new tagging patterns 21 into newest segment 160SN, control circuit 120 may maintain the age-based organization of cyclic buffer 160, where newest segment 160SN contains the most recently inserted patterns and oldest segment 160SO contains the oldest patterns.

In step S2060, control circuit 120 may coordinate the operation of tag matching mechanism 100 by issuing commands 121 to lookup engine 110 and memory access manager 130. Control circuit 120 may update status metadata 123 to reflect changes in the state of tag entries 140TE/160TE, and may provide telemetry 125 information that can be used for monitoring and optimizing the performance of tag matching mechanism 100. Control circuit 120 may subsequently return to step S2005 to continue monitoring the status of cyclic buffer 160 and appendage buffer 140.

As shown in the example of FIG. 3, tag matching mechanism 100 may further include a memory access manager 130. In this example, memory access manager 130 may enable system 10 to utilize tag matching mechanism 100 as a CAM or TCAM based interface, facilitating content-addressable access to memory device 40. Memory access manager 130 may provide a bridge between the pattern matching operations performed by lookup engine 110 and the data storage and retrieval operations performed on memory device 40.

Memory access manager 130 may be configured to calculate a target address of memory device 40 based on the index 110X of a located tag entry. For example, when lookup engine 110 locates a tag entry 140TE in appendage buffer 140 or a tag entry 160TE in cyclic buffer 160 that matches an incoming data block 23B, lookup engine 110 may output an index 110X identifying the position of the located tag entry. Memory access manager 130 may receive this index 110X and may use it to determine a corresponding target address 131T in memory device 40 where associated data is stored.

Once memory access manager 130 calculates the target address 131T, memory access manager 130 may be configured to access memory device 40 at the target address 131T to retrieve or write data corresponding to the incoming data packet 23.

For example, memory access manager 130 may read data from memory device 40 at target address 131T, and provide the read data to application 20. Additionally, or alternatively, memory access manager 130 may write data received from application 20 in packet 23, to memory device 40 at the calculated target address 131T. This functionality may enable application 20 to use the content of incoming data packets 23 as keys for accessing corresponding data in memory device 40, implementing the content-addressable memory paradigm.

According to some embodiments, memory access manager 130 may maintain an indirect addressing table 131. Indirect addressing table 131 may associate indices 110X of tag entries in appendage buffer 140 and/or cyclic buffer 160 with addresses of memory device 40. For example, indirect addressing table 131 may include entries that map each possible tag entry index 110X to a corresponding memory address in memory device 40.

Memory access manager 130 may be configured to calculate the target address by retrieving an entry of indirect addressing table 131 corresponding to the index 110X of the located tag entry 140TE/160TE. For example, when lookup engine 110 outputs an index 110X indicating that tag entry 140TE number 5 in appendage buffer 140 matched the incoming data block 23B, memory access manager 130 may look up entry number 5 in indirect addressing table 131 to retrieve the corresponding memory address 131T in memory device 40. Memory access manager 130 may then use this retrieved address 131T as the target address for accessing memory device 40. This indirect addressing approach may provide flexibility in managing the relationship between tagging patterns 140TP/160TP and memory locations, allowing the memory organization to be independent of the physical arrangement of tag entries in appendage buffer 140 and cyclic buffer 160.

According to some embodiments, memory access manager 130 may be configured to continuously maintain and update indirect addressing table 131 to reflect changes in the organization and status of tag entries 140TE/160TE in appendage buffer 140 and/or cyclic buffer 160. Memory access manager 130 may perform these updates under various conditions to ensure that the mapping between tag entry indices 110X and memory addresses 131T remains accurate and current.

For example, memory access manager 130 may be configured to continuously update indirect addressing table 131 to reflect the eviction of one or more tag entries 160TE from the oldest segment 160SO into the appendage buffer 140.

For example, when control circuit 120 evicts tag entries 160TE from oldest segment 160SO to appendage buffer 140, the indices of these tag entries may change as they are relocated from cyclic buffer 160 to appendage buffer 140. Memory access manager 130 may update the corresponding entries in indirect addressing table 131 to reflect the new indices of the evicted tag entries, ensuring that subsequent lookup operations by lookup engine 110 can correctly resolve the memory addresses associated with these patterns.

Additionally, or alternatively, memory access manager 130 may update indirect addressing table 131 following rotation of cyclic buffer 160. When control circuit 120 rotates cyclic buffer 160 by reassigning age designations to the segments, the relative positions and priorities of tag entries within the tag-matching search order may change. Memory access manager 130 may adjust indirect addressing table 131 to account for these changes, maintaining the correct association between tag entry indices and memory addresses in memory device 40. In some embodiments, shadow buffer 170, which holds a copy of the tagging patterns as described herein, may be conjoined with indirect addressing table 131. This conjunction may enable memory access manager 130 to maintain both the duplicate record of tagging patterns and the address mappings in a unified structure, facilitating efficient synchronization between pattern storage and memory address resolution.

Memory access manager 130 may also update indirect addressing table 131 following invalidation of tag entries. When lookup engine 110 invalidates a tag entry after matching it with an incoming data block 23B, or when application 20 issues a purge command to invalidate obsolete tag entries, memory access manager 130 may mark the corresponding entries in indirect addressing table 131 as invalid and therefore vacant or available for reuse. This may prevent subsequent operations from attempting to access memory locations associated with invalidated patterns.

Similarly, memory access manager 130 may update indirect addressing table 131 following compression of appendage buffer 140. When control circuit 120 compresses content of appendage buffer 140 by omitting gaps of invalidated tag entries and consolidating valid tag entries, the indices of tag entries 140TE within appendage buffer 140 may change as entries are shifted or relocated to eliminate gaps. Memory access manager 130 may update the corresponding entries in indirect addressing table 131 to reflect the new indices of the compressed tag entries, ensuring that lookup engine 110 can correctly resolve the memory addresses associated with these relocated patterns.

This update process may be important for maintaining the integrity and accuracy of the content-addressable memory interface provided by system 10. By continuously updating indirect addressing table 131 in response to evictions, rotations, and invalidations, memory access manager 130 may ensure that lookup engine 110 can reliably translate tag entry indices into valid memory addresses, enabling application 20 to access the correct data in memory device 40 based on the matched tagging patterns 140TP/160TP.

Figure 6:
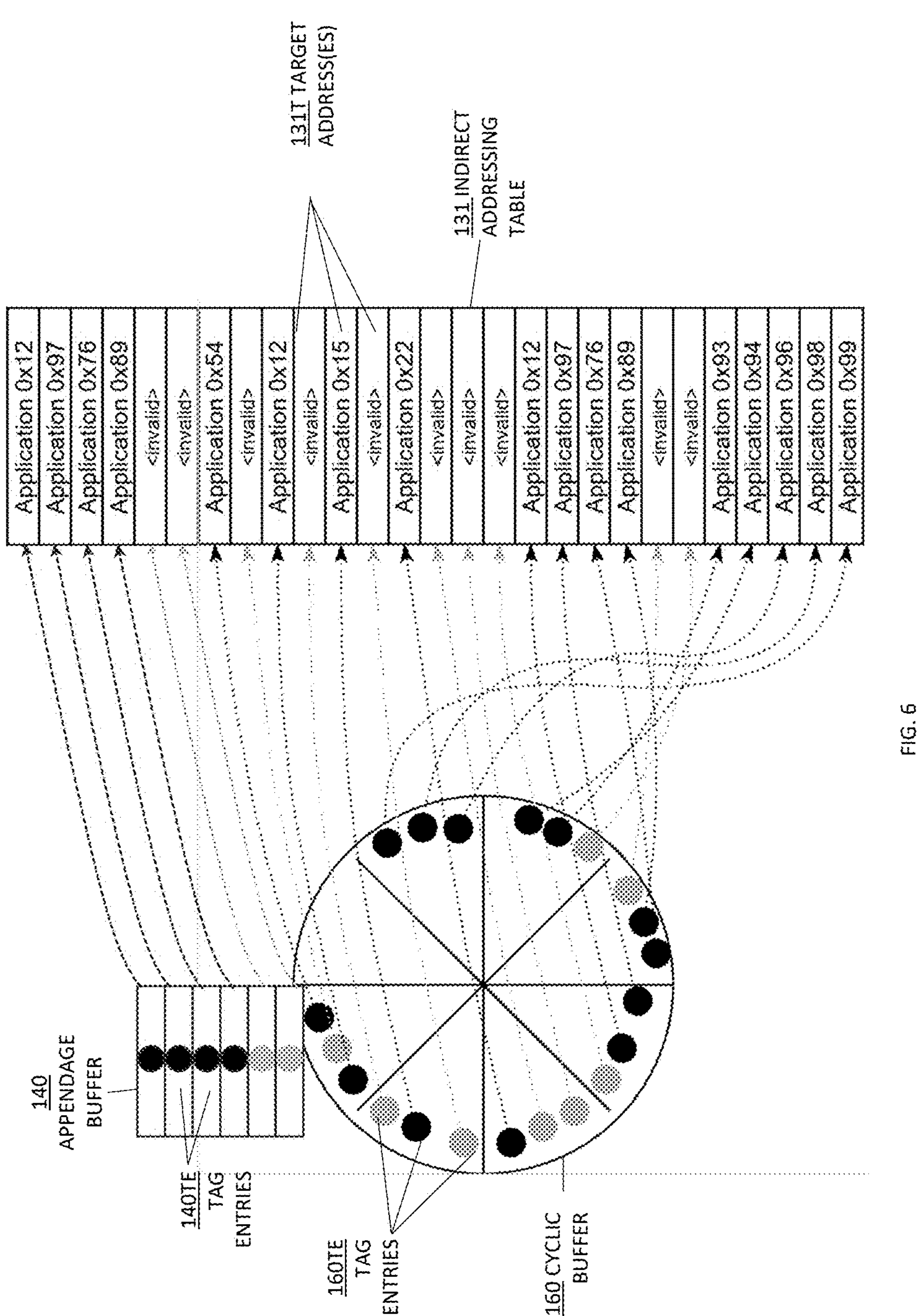
FIG. 6 is a schematic diagram depicting a reduced version of a tag matching mechanism configured for biased random access, according to some embodiments of the invention.

Referring now to FIG. 6, there is shown an exemplary implementation of tag matching mechanism 100 configured to operate as a queue controller. Tag matching mechanism 100 of FIG. 6 may be the same as tag matching mechanism 100 of FIG. 3, while some elements have been omitted from this figure for the sake of clarity.

As previously described with reference to FIG. 3, tag matching mechanism 100 comprises appendage buffer 140 and cyclic buffer 160, which collectively enable FIFO or queue management functionality. As elaborated herein, appendage buffer 140 and cyclic buffer 160 may implement a queue, or FIFO order. Entries may be retrieved or "fished" from the queue, creating holes at various positions, while new entries may be inserted at the queue's end. This queue structure may enable tag matching mechanism 100 to manage computing resources in an ordered manner while accommodating dynamic access patterns.

According to some embodiments, as shown in FIG. 6, tag matching mechanism 100 may implement a queue that may be accessed at random, while applying age-related preference. This biased random access capability may enable applications to select entries at random with a preference toward older entries, while ensuring that entries do not remain in the queue for an excessive time (e.g., indefinitely) and allowing flexibility in resource selection.

In the example depicted in FIG. 6, the tagging patterns 140TP/160TP are reduced to a trivial value, in a sense that entries may always match an incoming query or pattern. In other words, in this example, for the sake of simplicity, the tag entries 140TE/160TE are reduced to only maintain a status of validity or availability. This information is color-coded in FIG. 6, where black circles represent valid, unread entries, and grey circles represent vacant or invalidated tag entries 140TE/160TE. As explained herein with reference to FIG. 3, each tag entry 140TE/160TE may still be associated, for example via indirect addressing table 131 maintained by memory access manager 130, to a specific computing resource such as a memory location, a function, or an application.

A computing device 11 may randomly address an entry 140TE/160TE of the tag matching mechanism 100 (e.g., an entry in the queue) to invoke or utilize a corresponding computing resource, while preferring older entries to new ones. In the example of FIG. 6, these resources are referred to as individual applications to be invoked or accessed. This approach may enable computing device 11 to select from a pool of available resources while maintaining age-based fairness in the selection process.

For example, computing device 11 may calculate a random address of entries 140TE/160TE between 0 and (N−1), where N represents the total number of entries 140TE/160TE, by selecting a random floating-point value in that range, squaring it, dividing the result by N, and rounding to the nearest integer value. The result of such calculation will be biased towards lower numbers that may represent indices of older entries 140TE/160TE in the tag-matching search order. This biasing technique may ensure that older entries have a higher probability of being selected, preventing entries from aging indefinitely without being accessed.

Tag matching mechanism 100 may utilize the indirect addressing table 131 to invoke the computing resource, such as an application, associated with the randomly accessed entry 140TE/160TE, and may subsequently invalidate that accessed entry, thereby creating a "hole" in the queue.

Tag matching mechanism 100 may manage the queue of appendage buffer 140 and cyclic buffer 160 as described herein with reference to FIG. 3. For example, control circuit 120 may compress appendage buffer 140 as required by omitting gaps of invalidated tag entries, rotate cyclic buffer 160 as required by reassigning age designations to segments, insert content to new entries in newest segment 160SN, and revoke "dinosaur" entries that have aged beyond expectations, as explained above.

Figure 7:
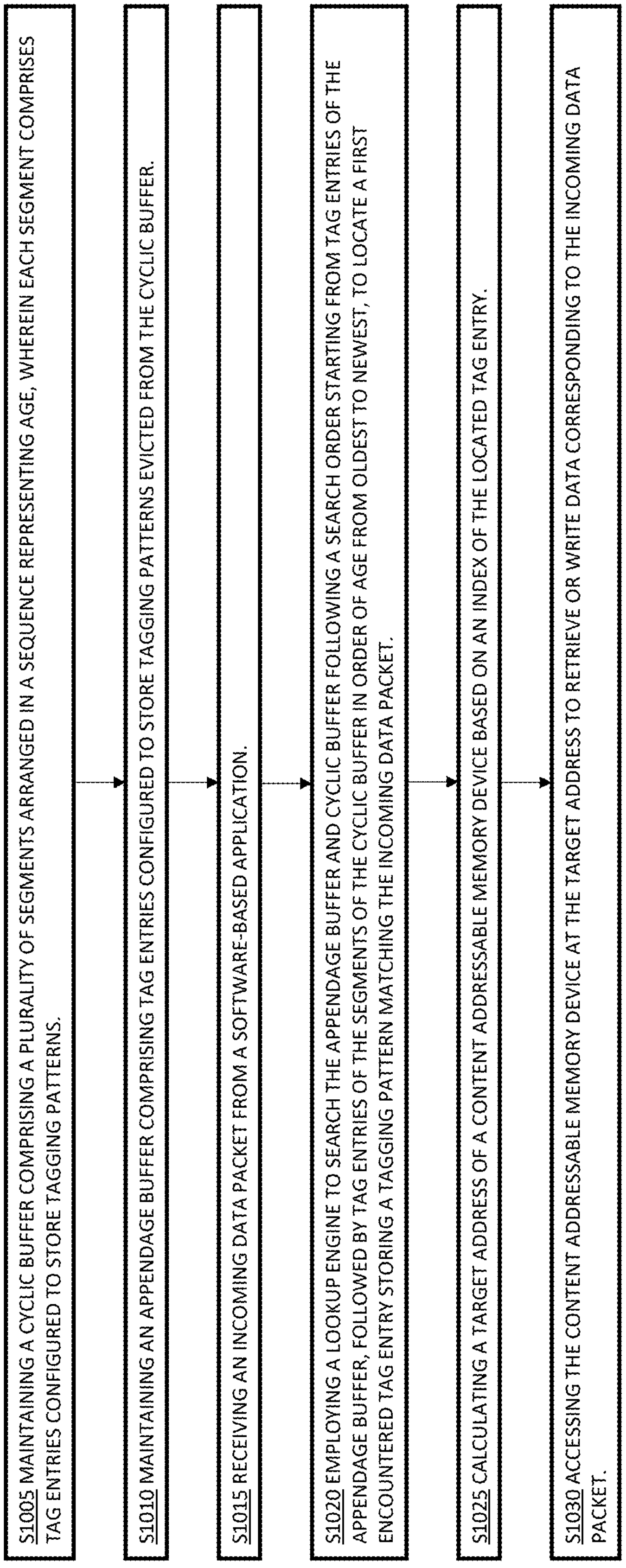
FIG. 7 is a flowchart illustrating a method of accessing a content addressable memory device by a hardware-based tag matching mechanism, according to some embodiments of the invention.

Reference is now made to FIG. 7, which is a flowchart illustrating a method of accessing a content addressable memory device (e.g., memory 40 of FIG. 3) by a hardware-based memory interface module 10, according to some embodiments of the invention. Hardware-based memory interface module 10 (or "interface 10" for short) may be the same as CAM and/or TCAM based interface module 10 of FIG. 3.

Embodiments of the method may begin with step S1005, in which interface 10 may maintain a cyclic buffer including a plurality of segments arranged in a sequence representing age. As shown in FIG. 3, cyclic buffer 160 may include multiple segments 160S, with each segment including tag entries 160TE configured to store tagging patterns 160TP. Segments 160S may be arranged in an age sequence, with oldest segment 160SO representing the segment containing the oldest tagging patterns 160TP and newest segment 160SN representing the segment that contains the most recently inserted tagging patterns 160TP. In some embodiments, the age-based organization of segments 160S may enable memory interface 10 to implement a fair, but age-biased queue structure where older patterns have higher priority in the tag-matching search order. In embodiments where strict order must be maintained, the age order may also be maintained within each segment 160S, such that the mechanism searches the entries of a segment starting from the oldest entry first. This may typically be implemented by allocating entries into a segment in order of incrementing address, and by matching entries of a segment according to a strict priority scheme whereby matches to entries of a lower address within the segment take precedence over matches to entries of the same segment with a higher address. Additionally, all matches within a given segment may take precedence over entries of newer segments, thereby preserving the overall age-based priority across the entire cyclic buffer 160.

In step S1010, memory interface 10 may maintain an appendage buffer 140 including tag entries configured to store tagging patterns evicted from the cyclic buffer. As shown in FIG. 3, appendage buffer 140 may include tag entries 140TE that store tagging patterns 140TP. These tagging patterns 140TP may represent patterns that have been evicted from cyclic buffer 160, allowing them to remain available for matching operations after eviction. In some embodiments, control circuit 120 may manage the eviction process by copying tagging patterns 160TP from oldest segment 160SO into available tag entries 140TE in appendage buffer 140, and may compress content of appendage buffer 140 by omitting gaps of invalidated tag entries to make room for newly evicted patterns. As shown in FIG. 4B, compression may be performed towards the oldest end of appendage buffer 140, typically the lowest-numbered entries, to allow maximum room for less-old entries coming from cyclic buffer 160 to be placed in the correct age position in appendage buffer 140.

In step S1015, memory interface 10 may receive an incoming data packet from an application element 20. As shown in FIG. 3, application element 20 may generate and transmit data packets 23 to tag matching mechanism 100. Each data packet 23 may include one or more data blocks 23B to be matched against the stored tagging patterns. In some embodiments, the data packet 23 may include network packet information such as IP addresses, port numbers, protocol types, or other header fields that application 20 needs to match against stored patterns. Lookup engine 110 may receive the incoming data packet 23 and may identify at least one data block 23B to be searched based on predetermined criteria or header information within the data packet.

In step S1020, memory interface 10 may employ a lookup engine to search the appendage buffer 140 and cyclic buffer 160 following a tag-matching search order starting from tag entries of the appendage buffer, followed by tag entries of the segments of the cyclic buffer in order of age from oldest to newest, to locate a first-encountered tag entry storing a tagging pattern 21 matching at least one portion of the incoming data packet 23. As shown in FIG. 3, lookup engine 110 may search through tag entries 140TE of appendage buffer 140 first, followed by tag entries 160TE of the segments of cyclic buffer 160 in order of age from oldest segment 160SO to newest segment 160SN. Additionally, lookup engine 110 may search within each segment 160S in order of age, from oldest to newest entries within the segment. This tag-matching search order may provide advantages in terms of matching priority, where older patterns may have higher priority in the tag-matching search order. In some embodiments, lookup engine 110 may include one or more lookup heads 110H that enable concurrent search operations at different locations of appendage buffer 140 and cyclic buffer 160.

When lookup engine 110 locates a tag entry 140TE/160TE that stores a tagging pattern matching the data block 23B of the incoming data packet, lookup engine 110 may output an index 110X identifying the position of the located tag entry and may invalidate the located tag entry 140TE/160TE to make it vacant or available for reuse.

In step S1025, memory interface 10 may calculate a target address of a content addressable memory device based on an index of the located tag entry. As shown in FIG. 3, memory access manager 130 may receive the index 110X output by lookup engine 110 and may use it to determine a corresponding target address 131T in memory device 40. In some embodiments, memory access manager 130 may maintain an indirect addressing table 131 that associates indices 110X of tag entries in appendage buffer 140 and/or cyclic buffer 160 with addresses of memory device 40. Memory access manager 130 may calculate the target address 131T by retrieving an entry of indirect addressing table 131 corresponding to the index 110X of the located tag entry. This indirect addressing approach may provide flexibility in managing the relationship between tagging patterns and memory locations, allowing the memory organization to be independent of the physical arrangement of tag entries in appendage buffer 140 and cyclic buffer 160.

In step S1030, memory interface 10 may access the content addressable memory device at the target address to retrieve or write data corresponding to the incoming data packet. As shown in FIG. 3, memory access manager 130 may access memory device 40 at the calculated target address 131T. In some embodiments, memory access manager 130 may read data from memory device 40 at target address 131T and provide the read data to application 20. Additionally, or alternatively, memory access manager 130 may write data received from application 20 in data packet 23 to memory device 40 at the calculated target address 131T. This functionality may enable application 20 to use the content of incoming data packets 23 as keys for accessing corresponding data in memory device 40, implementing the content-addressable memory paradigm.

Embodiments of the invention may provide a hardware-based tag matching mechanism that improves computing technology by enabling efficient and configurable queue management, while maintaining temporal ordering of entries. As explained, such embodiments may be beneficial, for example, for implementing content addressable memory systems.

The cyclic buffer architecture with age-organized segments and an appendage buffer for evicted patterns may address limitations of conventional CAM/TCAM-based systems in several ways.

For example, embodiments of the invention may significantly reduce the computational overhead associated with buffer management operations. Conventional approaches require time-consuming compression operations that involve moving potentially thousands of entries, with each entry requiring a read and write cycle. In contrast, embodiments of the invention may move only a small number of entries (e.g., twenty or so entries instead of thousands) by evicting entries from the oldest segment to the appendage buffer and rotating the cyclic buffer by reassigning age designations without physically relocating entries between segments.

Additionally, embodiments of the invention may maintain the desired FIFO ordering properties for queue management while accommodating dynamic insertion and removal of tagging patterns. Conventional approaches that place new entries in available positions may break the desired FIFO principle, causing problems with sequentially assigned hardware resources and disrupting the intended execution sequence. The age-based organization of segments in embodiments of the invention may ensure that older patterns have higher priority in the tag-matching search order, preserving temporal precedence and enabling fair resource allocation among competing processes.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A hardware-based tag matching mechanism comprising:
- a cyclic buffer comprising a plurality of segments arranged in a sequence representing age, wherein each segment comprises a plurality of tag entries, each tag entry configured to store a respective tagging pattern;
- an appendage buffer comprising tag entries configured to store tagging patterns evicted from the cyclic buffer;
- a lookup engine configured to match at least one portion of incoming data packets against the stored tagging patterns, wherein the lookup engine follows a predetermined tag-matching search order; and
- a control circuit configured to evict tag entries from a current oldest segment of the cyclic buffer to the appendage buffer, and subsequently rotate the cyclic buffer to redefine the oldest segment.

2. The hardware-based tag matching mechanism of claim 1, wherein the tag-matching search order starts from tag entries of the appendage buffer, followed by tag entries of the segments of the cyclic buffer in order of age from oldest to newest.

3. The hardware-based tag matching mechanism of claim 1, wherein the lookup engine is further configured to:
- receive a data block pertaining to an incoming data packet;
- search the appendage buffer and cyclic buffer following the search order to locate a first-encountered tag entry that stores a tagging pattern which matches the data block; and
- output an index of the located tag entry in the appendage buffer or cyclic buffer.

4. The hardware-based tag matching mechanism of claim 3, wherein the tagging patterns comprise wildcards or mask bits that specify which portions of the at least one data block are matched against the stored tagging patterns.

5. The hardware-based tag matching mechanism of claim 3 wherein the lookup engine is further configured to invalidate the located tag entry.

6. The hardware-based tag matching mechanism of claim 3, further comprising a memory access manager configured to:
- calculate a target address of a memory device, based on the index of the located tag entry; and
- access the memory device at the target address, to retrieve or write data corresponding to the incoming data packet.

7. The hardware-based tag matching mechanism of claim 6, wherein the memory access manager is further configured to:
- maintain an indirect addressing table associating indices of tag entries in the appendage buffer and/or cyclic buffer with addresses of the memory device; and
- calculate the target address by retrieving an entry of the indirect addressing table, corresponding to the index of the located tag entry.

8. The hardware-based tag matching mechanism of claim 7, wherein the control circuit is configured to:
- evict one or more tag entries of the current oldest segment by making a duplicate of their tagging patterns into vacant or invalidated tag entries in the appendage buffer, according to a predetermined vacancy search order, from newest to oldest entries; and
- invalidate the evicted tag entries in the current oldest segment.

9. The hardware-based tag matching mechanism of claim 8, wherein as part of copying a tagging pattern, the control circuit is further configured to perform at least one of: (i) detecting a parity error in the tagging pattern (ii) correcting a data error in the tagging pattern using an error-correcting code, and (iii) restoring the tagging pattern from a shadow memory.

10. The hardware-based tag matching mechanism of claim 8, wherein the memory access manager is further configured to continuously update the indirect addressing table to reflect the eviction of one or more tag entries from the oldest segment into the appendage buffer.

11. The hardware-based tag matching mechanism of claim 1, wherein the control circuit is configured to rotate the cyclic buffer by reassigning age designations to the segments without physically relocating entries between segments of the cyclic buffer, such that a segment previously designated as second-oldest becomes a new oldest segment after rotation.

12. The hardware-based tag matching mechanism of claim 1, wherein the control circuit is further configured to:

continuously receive incoming tagging patterns from an application element, each tagging pattern representing a respective configuration of interest in a process of the application element;

for each incoming tagging pattern, locate a last vacant entry along the vacancy search order, that is followed by a non-vacant entry; and store the incoming tagging pattern in the located vacant entry.

13. The hardware-based tag matching mechanism of claim 1, wherein prior to evicting tag entries from the current oldest segment of the cyclic buffer to the appendage buffer, the control circuit is further configured to compress content of the appendage buffer by omitting gaps of invalidated tag entries, to make room for the tag entries to be evicted from the oldest segment.

14. The hardware-based tag matching mechanism of claim 1, wherein the control circuit is configured to:

aggregate metadata associated with each tag entry, selected from a list consisting of insertion timestamp, priority level and validity status;

determine that the newest segment of the cyclic buffer is expected to approach a predetermined occupancy level threshold within a predetermined timeframe, based on the aggregated metadata; and initiate eviction of tag entries from the oldest segment to the appendage buffer, and subsequent rotation of the cyclic buffer, in accordance with said determination.

15. The hardware-based tag matching mechanism of claim 1, wherein the tagging patterns pertain to data types selected from a list consisting of: Internet Protocol (IP) header patterns, IPv4 address patterns, IPv6 address patterns, protocol type patterns and port number patterns.

16. The hardware-based tag matching mechanism of claim 1, wherein the lookup engine comprises a plurality of lookup heads, wherein said plurality of lookup heads are configured to concurrently perform search operations across multiple tag entries in the appendage buffer and the cyclic buffer.

17. A Content Addressable Memory (CAM)-based interface comprising:

a cyclic buffer comprising a plurality of segments arranged in a sequence representing age, wherein each segment comprises tag entries configured to store tagging patterns;

an appendage buffer comprising tag entries configured to store tagging patterns evicted from the cyclic buffer;

a lookup engine configured to (i) receive an incoming data packet from an application element, and (ii) search the appendage buffer and cyclic buffer following a tag-matching search order starting from tag entries of the appendage buffer, followed by tag entries of the segments of the cyclic buffer in order of age from oldest to newest, to locate a first-encountered tag entry storing a tagging pattern matching at least one portion of the incoming data packet; and a memory access manager configured to (i) calculate a target address of a memory device based on an index of the located tag entry, and (ii) access the memory device at the target address to retrieve or write data corresponding to the incoming data packet.

18. A method of accessing Content Addressable Memory (CAM), the method comprising:

maintaining a cyclic buffer comprising a plurality of segments arranged in a sequence representing age, wherein each segment comprises tag entries configured to store tagging patterns;

maintaining an appendage buffer comprising tag entries configured to store tagging patterns evicted from the cyclic buffer;

receiving an incoming data packet from an application element;

employing a lookup engine to search the appendage buffer and cyclic buffer following a tag-matching search order starting from tag entries of the appendage buffer, followed by tag entries of the segments of the cyclic buffer in order of age from oldest to newest, to locate a first-encountered tag entry storing a tagging pattern matching at least one portion of the incoming data packet;

calculating a target address of a content addressable memory device based on an index of the located tag entry; and accessing the content addressable memory device at the target address to retrieve or write data corresponding to the incoming data packet.

19. The method of claim 18, further comprising:

receiving incoming tagging patterns from the application element, each tagging pattern representing a respective configuration of interest in a process of the application element;

for each incoming tagging pattern, locating a last vacant entry in the cyclic buffer, along the vacancy search order, that is followed by an older, non-vacant entry; and storing the incoming tagging pattern in the located tag entry.

20. The method of claim 19, further comprising:

identifying at least one data block of the incoming data packet to be searched;

employing the lookup engine to search the appendage buffer and cyclic buffer following the tag-matching search order to locate a first-encountered tag entry that stores a tagging pattern which matches the data block;

outputting an index of the located tag entry in the appendage buffer or cyclic buffer; and invalidating the located tag entry.

21. The method of claim 20, wherein the application element is configured to:

maintain an association between processes of the application element and tag entries in the appendage buffer or cyclic buffer;

identify obsolete tag entries pertaining to a terminated process of the application element based on the maintained association; and transmit a synthetic packet comprising a data block having content that matches the tagging patterns of the obsolete tag entries, thereby causing the lookup engine to locate, and invalidate the obsolete tag entries.

* * * * *